(12) United States Patent
Annen et al.

(10) Patent No.: US 7,375,920 B2
(45) Date of Patent: May 20, 2008

(54) MAGNETIC RECORDING/REPRODUCING APPARATUS

(75) Inventors: Ryoichi Annen, Atsugi (JP); Kazuya Tamura, Atsugi (JP); Kazuhide Murase, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 393 days.

(21) Appl. No.: 11/159,875

(22) Filed: Jun. 23, 2005

(65) Prior Publication Data

US 2006/0066988 A1   Mar. 30, 2006

(30) Foreign Application Priority Data

Sep. 30, 2004 (JP) .............................. 2004-288244

(51) Int. Cl.
*G11B 15/665* (2006.01)
*G11B 15/61* (2006.01)
*G11B 5/008* (2006.01)

(52) U.S. Cl. .................. 360/85; 360/94; 360/96.51

(58) Field of Classification Search .................. 360/85, 360/69, 71, 130.2–130.23, 94, 96.51
See application file for complete search history.

(56) References Cited

U.S. PATENT DOCUMENTS

| | | | |
|---|---|---|---|
| 5,343,338 A | * | 8/1994 | Murata et al. ............. 360/69 |
| 6,079,653 A | * | 6/2000 | Anderson et al. ........... 242/336 |
| 2005/0111139 A1 | * | 5/2005 | Shinjo et al. .......... 360/130.23 |
| 2005/0248874 A1 | * | 11/2005 | Monk .......................... 360/85 |
| 2005/0248875 A1 | * | 11/2005 | Monk .......................... 360/85 |
| 2006/0023345 A1 | * | 2/2006 | Maule ......................... 360/85 |
| 2006/0066989 A1 | * | 3/2006 | Annen et al. ................. 360/85 |

FOREIGN PATENT DOCUMENTS

| | | | |
|---|---|---|---|
| JP | 61131264 A | * | 6/1986 |
| JP | 06 150201 | | 5/1994 |

* cited by examiner

*Primary Examiner*—William J Klimowicz
(74) *Attorney, Agent, or Firm*—Ladas & Parry LLP

(57) ABSTRACT

A magnetic recording/reproducing apparatus is disclosed that is arranged to receive a tape cassette accommodating a tape recording medium that is selectively loaded thereto. The apparatus includes a rotating drum unit having a rotating head, and a loading mechanism that is configured to pull the tape recording medium of the loaded tape cassette out of the loaded tape cassette, wind the tape recording medium around the rotating drum unit, and form a tape path. The loading mechanism includes a short loading pole that is adapted for a first tape cassette accommodating a narrow tape recording medium and a long loading pole that is adapted for a second tape cassette accommodating a wide tape recording medium, which short pole and long pole are positioned at the same height, and a loading pole raising mechanism that is configured to raise the long loading pole when the second tape cassette is loaded.

3 Claims, 29 Drawing Sheets

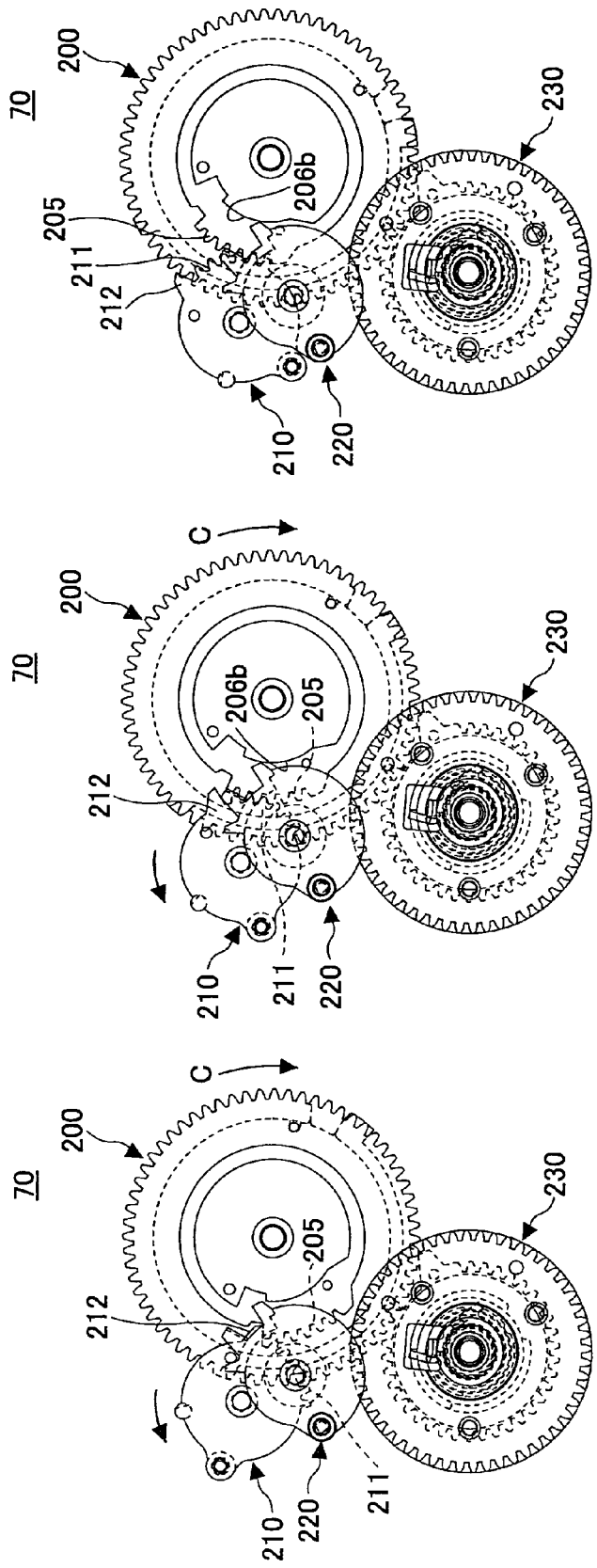

MAGNETIC RECORDING/REPRODUCING APPARATUS

BACKGROUND OF THE INVENTION

1. Field of the Invention

The present invention relates generally to a magnetic recording/reproducing apparatus such as a streamer device that is used as a peripheral storage device of a computer. The present invention particularly relates to a magnetic recording/reproducing apparatus using a tape cassette and including a rotation drum and a tape loading mechanism, which magnetic recording/reproducing apparatus is capable of selectively loading a first tape cassette that accommodates a first magnetic tape having a first width W1 or a second tape cassette that accommodates a second magnetic tape having a second width W2 that is twice the first width W1 of the first magnetic tape.

2. Description of the Related Art

As one type of magnetic recording/reproducing apparatus that is used as a peripheral storage device of a computer, a streamer device using a tape cassette and including a rotating drum and a tape loading mechanism like the VTR is being commercialized.

The storage capacity of a conventional streamer device is relatively large at around 72 GB in compression mode, for example. Yet, there is a market demand for a streamer device with a larger storage capacity, and in turn, various manufacturers are developing new techniques for improving the streamer device.

As one way of increasing the storage capacity of the streamer device, a new tape cassette that accommodates a magnetic tape having a tape width that is wider than the tape width of the magnetic tape of the conventional tape cassette may be used.

SUMMARY OF THE INVENTION

In consideration of the fact that the conventional streamer device is still used and information is recorded on the conventional tape cassette by the conventional streamer device, it is an object of the present invention to provide a new streamer device that is capable of using a new tape cassette, is compatible with the conventional streamer device, is capable of using the conventional tape cassette, and is capable of accurately reproducing information recorded on the conventional tape cassette by the conventional streamer device.

According to an aspect of the present invention, a magnetic recording/reproducing apparatus is provided that is arranged to receive a tape cassette accommodating a tape recording medium that is selectively loaded thereto, the loaded tape cassette being selected from a plurality of types of tape cassettes including a first tape cassette accommodating a first tape recording medium having a first width and a second tape cassette accommodating a second tape recording medium having a second width that is greater than the first width, the apparatus including:

a rotating drum unit including a rotating head; and a loading mechanism that is configured to pull the tape recording medium of the loaded tape cassette out of the loaded tape cassette, wind the tape recording medium of the loaded tape cassette around the rotating drum unit, and form a tape path;

wherein the loading mechanism includes a short loading pole that is adapted for the first tape cassette, and a long loading pole that is adapted for the second tape cassette, the short pole and the long pole being positioned at the same height; and a loading pole raising mechanism that is configured to raise the long loading pole when the second tape cassette is loaded.

According to an aspect of the present invention, a long loading pole is arranged to be positioned at the same height as that of a short pole so that a first tape cassette accommodating a narrow tape recording medium may be suitably loaded without encountering any obstacles. When a second tape cassette accommodating a wide tape recording medium is loaded, the long loading pole may be raised to extend across and face the wide tape recording medium so that the wide tape recording medium may be stably pulled out without being damaged.

BRIEF DESCRIPTION OF THE DRAWINGS

FIGS. 25A~25C are diagrams illustrating motion transmission to a first drive gear that is performed in response to a clockwise rotation of an individual mode switching gear;

DETAILED DESCRIPTION OF THE PREFERRED EMBODIMENTS

In the following, principles and embodiments of the present invention are described with reference to the accompanying drawings.

Indicated below is a list of subjects to be discussed in the following description.

1. Outline of Streamer Device 30
2. Structures of Tape Cassettes 10 and 20
3. Outline of Tape Loading Operation
4. Tape Loading Operation for Conventional Tape Cassette 10
5. Tape Loading Operation for New Tape Cassette 20
6. Common Operations Mechanism
7. Common Operations
8. Individual Operations Mechanism
9. Individual Operations 1. [Outline of Streamer Device 30]

Figure 1:
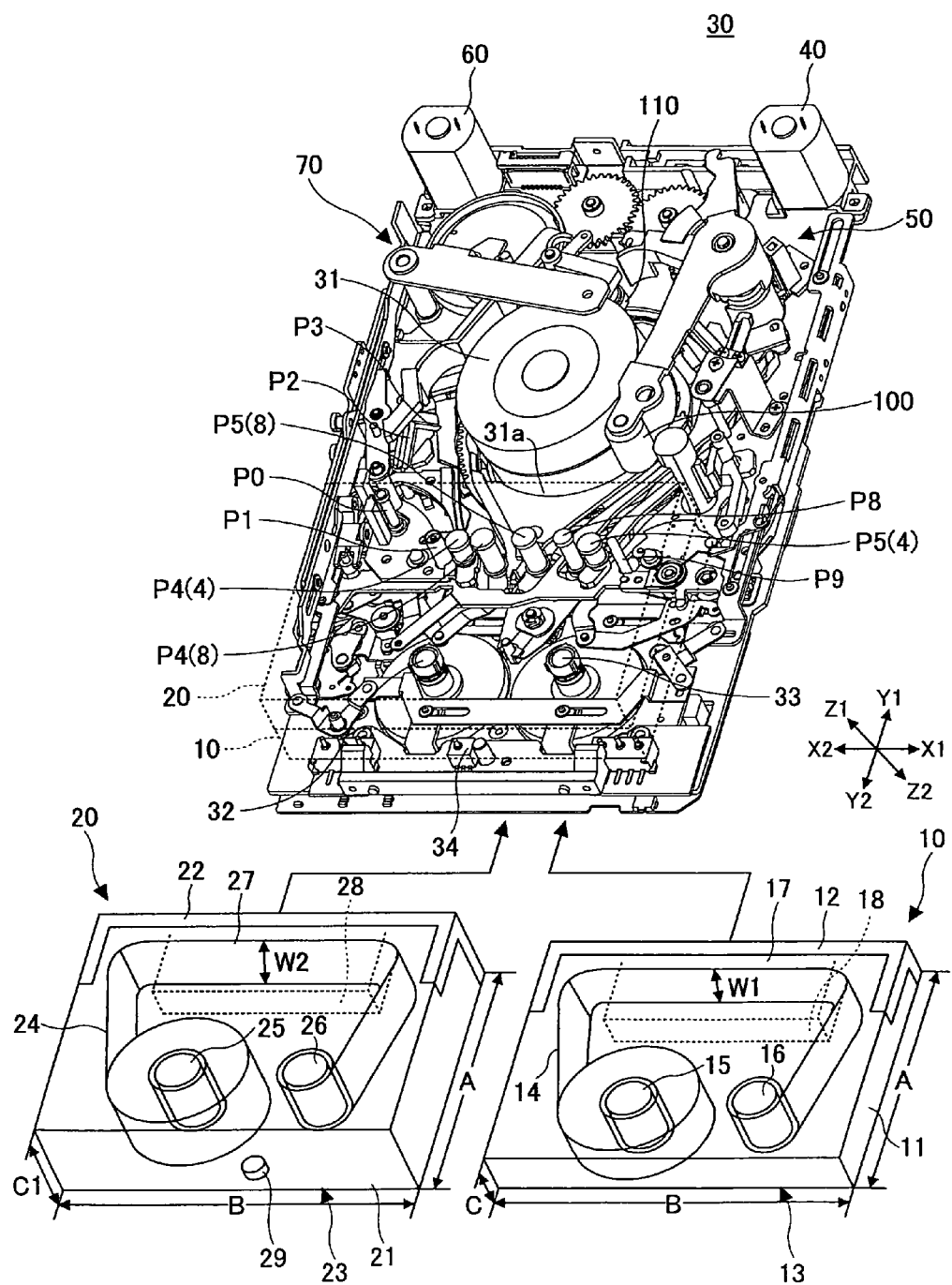
FIG. 1 is a diagram showing a conventional tape cassette, a new tape cassette, and a streamer device according to an embodiment of the present invention in perspective view.

FIG. 1 is a diagram showing a structure of a streamer device 30 according to an embodiment of the present invention. In the following, overall functions and operations of the streamer device 30 are described.

Figure 2:
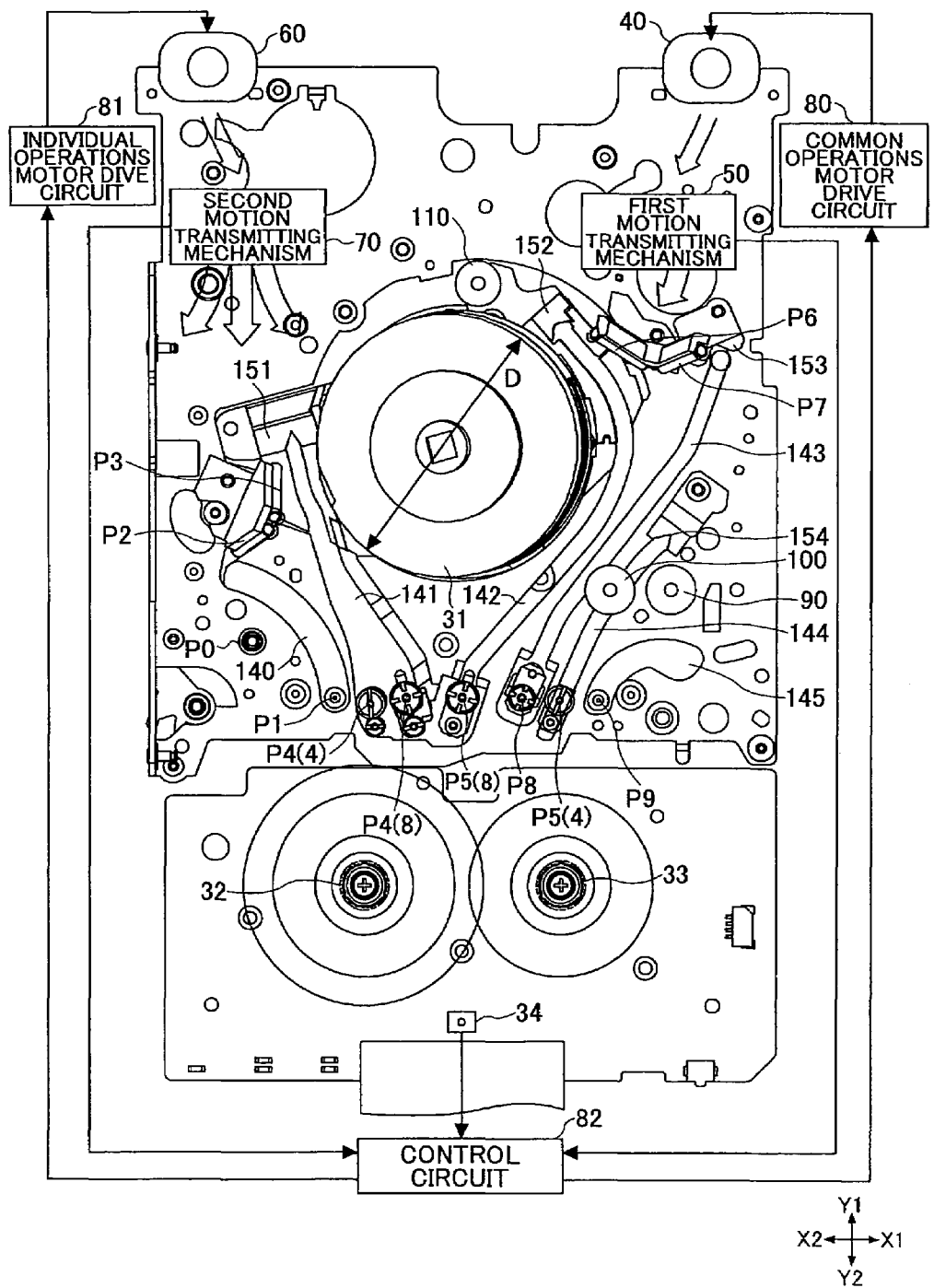
FIG. 2 is a diagram showing the streamer device of FIG. 1 in plan view.
Figure 7A:
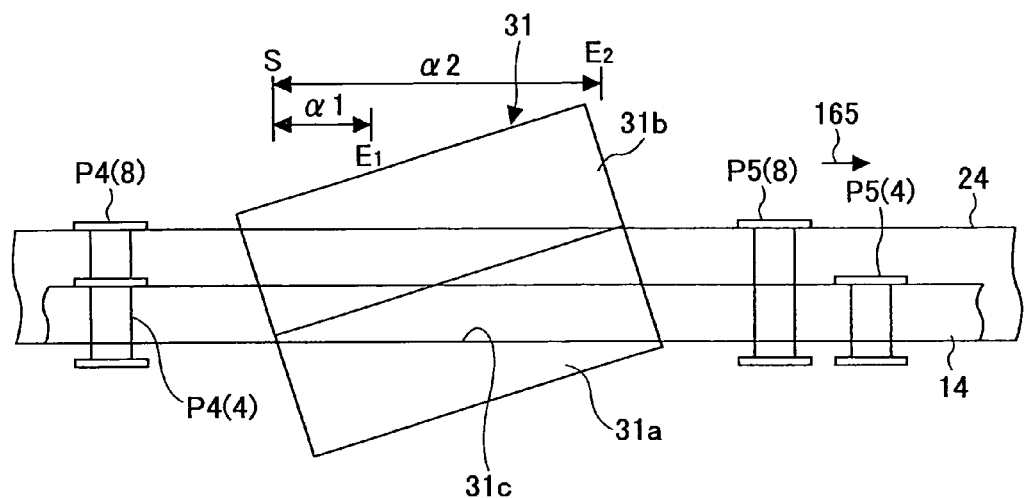
FIGS. 7A~7C are diagrams showing a 4 mm-width magnetic tape and an 8 mm-width magnetic tape that are wound onto a rotating drum unit, and track patterns that are formed on the magnetic tapes.

FIGS. 1 and 2 illustrate the state of the streamer device 30 before a tape cassette is loaded thereto. It is noted that in these drawings, directions X1-X2 represent width directions, directions Y1-Y2 represent length directions, and directions Z1-Z2 represent height directions. The streamer device 30 is capable of selectively loading a conventional tape cassette 10 or a new tape cassette 20, and is configured to record information on a magnetic tape 14 with a width of 4 mm as well as a magnetic tape 24 with a width of 8 mm. To realize such a configuration, a rotating drum unit 31 of the streamer device 30 according to the present embodiment has a greater diameter D and height H compared to a rotating drum unit provided in a conventional streamer device. Also, in the streamer device 30, the winding angle for winding the magnetic tape with a width of 8 mm onto the rotating drum unit 31 is arranged to be greater than the winding angle for the magnetic tape with a width of 4 mm. As is shown in FIG. 7A, the rotating drum 31 includes a lower stationary drum 31a and an upper rotating drum 31b. A rotating head is fixed to the bottom surface of the rotating drum 31b, and a tape guide 31c for guiding the bottom edge of the magnetic tape 14/24 onto the stationary drum 31a is provided.

The streamer device 30 includes a cassette loading mechanism (not shown), the rotating drum unit 31 having plural rotating heads, a common operations motor 40, a first motion transmitting mechanism 50 that transmits the rotation of the common operations motor 40, an individual operations motor 60, a second motion transmitting mechanism 70 that transmits the rotation of the individual operations motor 60 in a clockwise direction to a first part and transmits the rotation of the individual operations motor 60 in a counter-clockwise direction to a second part, a common operations motor drive circuit 80, an individual operations motor drive circuit 81, and a control circuit 82 including a microcomputer, for example. The cassette loading mechanism includes a housing that is adapted for the new tape cassette 20, and is configured to be capable of selectively loading the conventional tape cassette 10 and the new tape cassette 20. The rotating drum unit 31 is provided around a center region of the streamer device 30, and is tilted toward the X2 direction. The common operations motor 40 is provided at the X1 side of the Y1 side edge of the streamer device 30. The individual operations motor 60 is provided at the X2 side of the Y1 side edge of the streamer device 30. The first motion transmitting mechanism 50 is provided close to the common operations motor 40, and the second motion transmitting unit 70 is provided close to the individual operations motor 60. It is noted that according to the present embodiment, the motor is divided into the common operations motor 40 and the individual operations motor 60, and the second motion transmitting mechanism 70 is configured to be able to switch the mechanism to which the rotation of the individual operations motor 60 is to be transmitted according to the rotation direction thereof. In this way, a single individual operations motor 60 may be sufficient for operating the two different types of tape cassettes 10 and 20, and the size of the streamer device 30 may be miniaturized.

The common operations motor 40 is driven when operating a common tape loading mechanism directed to both the magnetic tape 14 with a width of 4 mm and the magnetic tape 24 with a width of 8 mm. The rotation of the common operations motor 40 is transmitted to the common tape loading mechanism via the first motion transmitting mechanism 50 so that the common tape loading mechanism may be operated.

The individual operations motor 60 is rotated in a clockwise direction upon operating a 4 mm-width magnetic tape loading mechanism directed to the magnetic tape 14 with a width of 4 mm. The individual operations motor 60 is rotated in a counter-clockwise direction upon operating an 8 mm-width magnetic tape loading mechanism directed to the magnetic tape 24 with a width of 8 mm. The rotation of the individual operations motor 60 in the clockwise direction is transmitted to the 4 mm-width magnetic tape loading mechanism via the second motion transmitting mechanism 50 so that the 4 mm-width magnetic tape loading mechanism may be operated. The rotation of the individual operations motor 60 in the counter-clockwise direction is transmitted to the 8 mm-width magnetic tape loading mechanism via the second motion transmitting mechanism 50 so that the 8 mm-width magnetic tape loading mechanism may be operated.

The streamer device 30 also includes loading poles P0~P9 (simply referred to as 'pole' hereinafter), a capstan 90, a pinch roller 100, and a head cleaner 110. The poles P0, P1, P2, P3, and P9 are commonly used by both the magnetic tapes with widths of 4 mm and 8 mm. The poles P4(4) and P5(4) are dedicated to the magnetic tape 14 with a width of 4 mm, and poles P4(8), P5(8), P6, P7, and P8 are dedicated to the magnetic tape 24 with a width of 8 mm. It is noted that the numbers 4 and 8 in parentheses indicate the magnetic tape widths in millimeter units. The poles P0, P1, P2, P3 realize the common tape loading mechanism, the poles P4(4) and P5(4) realize the 4 mm-width magnetic tape loading mechanism, and the poles P4(8), P5(8), P6, P7, and P8 realize the 8 mm-width magnetic tape loading mechanism. As can be appreciated from the above descriptions, according to the present embodiment, a common tape loading mechanism that is commonly used by the magnetic tapes 14 and 24 with widths of 4 mm and 8 mm, respectively, is provided, and thereby, a number of poles may be commonly used by the magnetic tapes 14 and 24. In this way, the number of poles may be reduced compared to the case of separately providing a tape loading mechanism dedicated to the magnetic tape 14 with a width of 4 mm, and a tape loading mechanism dedicated to the magnetic tape 24 with a width of 8 mm.

Also, it is noted that the poles P0, P2, P3, P6, and P7 correspond to stationary poles, and poles P1, P4(4), P4(8), P5(8), P8, P5(4), and P9 correspond to moving poles. The pole P0 is positioned at the X2 side of a tape cassette loading portion. The poles P2 and P3 are arranged such that their upper ends tilt toward each other to form a pair. The poles P2 and P3 are positioned at the entrance side of the rotating drum unit 31 with respect to the scanning direction of the magnetic tape, and are configured to provide a twist to the magnetic tape. The poles P5 and P6 are arranged such that their upper ends tilt away from each other to form a pair. The poles P5 and P6 are positioned at the exit side of the rotating drum unit 31 with respect to the scanning direction of the magnetic tape, and are configured to provide a twist to the magnetic tape. The capstan 90 is positioned at the X1 side of the cassette loading portion. The pinch roller 100 is normally positioned at a high position, and is positioned close to the capstan 90. The moving poles P1, P4(4), P4(8), P5(8), P8, P5(4), and P9 are arranged within the tape cassette loading portion in this order from the X2 side to the X1 side.

Of the moving poles P1, P4(4), P4(8), P5(8), P8, P5(4), and P9, the poles P1, P4(8), P5(8), P8, and P9 are arranged to be longer than the poles P4(4) and P5(4). The longer poles P1, P4(8), P5(8), P8, and P9 are lowered in the Z2 direction with respect to the shorter poles P4(4) and P5(4) so that the heights of the top ends of the moving poles P1, P4(4), P4(8), P5(8), P8, P5(4), and P9 are arranged to be the same. As is described in detail below, according to this arrangement, the bottom edge of the conventional tape cassette 10 may be loaded at the same height as that of the new tape cassette 20 without interfering with the longer poles.

2. [Structures of Tape Cassettes 10 and 20]

In the following, the structures of the tape cassettes 10 and 20 are described with reference to FIG. 1.

The conventional tape cassette 10 includes a cassette body 13 that is made of a box structure 11, a front lid 12, and a bottom slide board (not shown) which cassette body 13 accommodates the magnetic tape 14 that is wound onto a supply reel 15 and a winding reel 16, and forms a tape path 17 along a rear surface of the lid 12. Also, at the front side portion of the bottom surface of the cassette body 13, a pole accommodating space 18 that is opened upon loading the tape cassette 10 is provided. The new tape cassette 20 includes a cassette body 23 that is made of a box structure 21, a front lid 22, and a bottom slide board (not shown) which cassette body 23 accommodates the magnetic tape 24 that is wound onto a supply reel 25 and a winding reel 26, and forms a tape path 27 along a rear surface of the lid 22. Also, at the front side portion of the bottom surface of the cassette body 23, a pole accommodating space 28 that is opened upon loading the tape cassette 20 is provided. It is noted that the new tape cassette 20 is arranged to have the same length A and width B dimensions as the conventional tape cassette 10. The height C of the new tape cassette 20 is arranged to be 1.5 times the height C of the conventional tape cassette 10. Also, it is noted that a recessed portion 29 is formed at the rear edge middle portion of the bottom surface of the box structure 21 of the new tape cassette 20.

The portion of the streamer device 30 to which the conventional tape cassette 10 and the new tape cassette 20 are loaded includes a supply reel axle unit 32, a winding axis unit 33, and a tape cassette identifying switch 34. The tape cassette loading mechanisms are arranged such that the height position of the bottom surface of the new tape cassette 20 upon being loaded corresponds to the loaded height position of the bottom surface of the conventional tape cassette 10.

3. [Outline of Tape Loading Operations]

In the following, an overall description of tape loading operations of the streamer device 30 is given.

Figure 3:
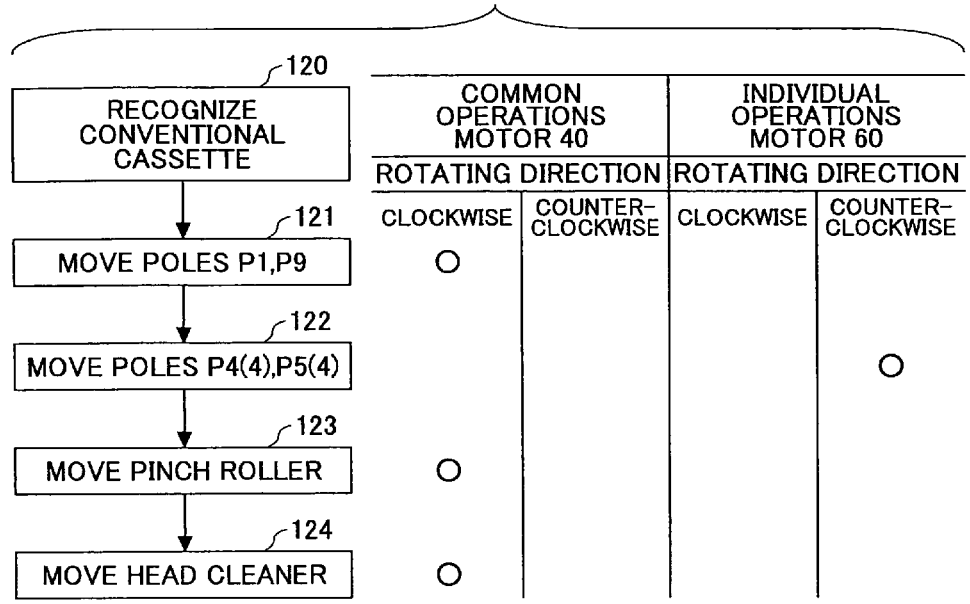
FIG. 3 is a flowchart illustrating tape loading operations that are performed when the conventional tape cassette is loaded into the streamer device.

Referring to FIG. 3, when the conventional tape cassette 10 is loaded, a conventional tape cassette recognition operation 120, poles P1 and P9 moving operations 121, poles P4(4) and P5(4) moving operations 122, a pinch roller moving operation 123, and a head cleaner moving operation 124 are performed in this order.

Figure 4:
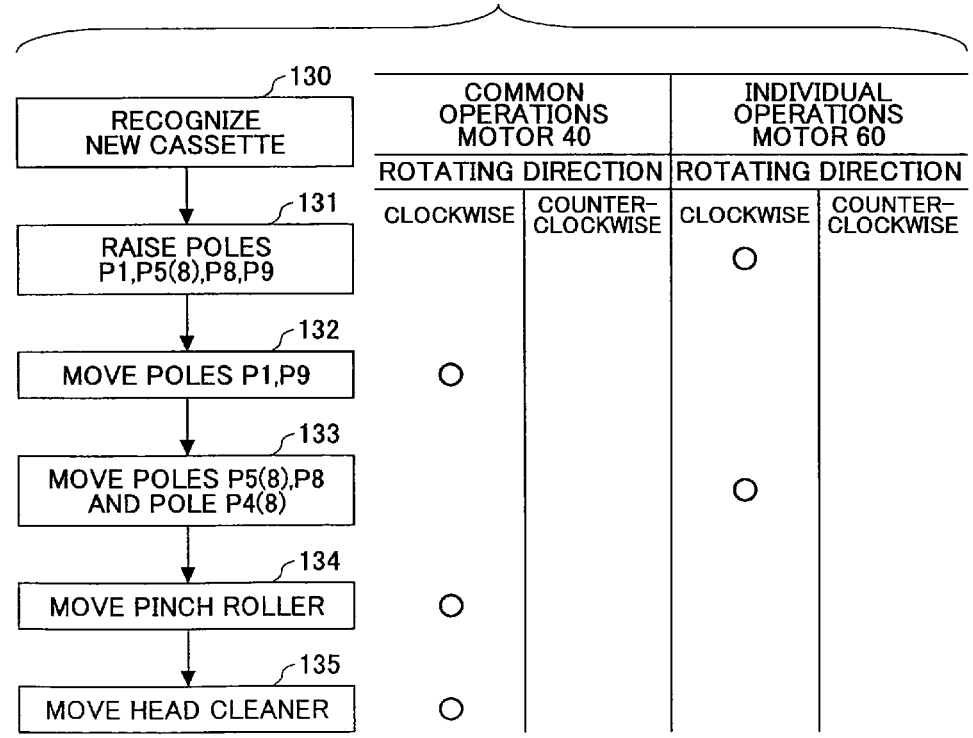
FIG. 4 is a flowchart illustrating tape loading operations that are performed when the new tape cassette is loaded into the streamer device.

Referring to FIG. 4, when the new tape cassette 20 is loaded, a new tape cassette recognition operation 130, poles P1, P5(8), P8, and P9 raising operations 131, poles P1 and P9 moving operations 132, poles P5(8), P8, and P4(8) moving operations 133, a pinch roller moving operation 134, and a head cleaner moving operation 135 are performed in this order.

The poles P1 and P9 moving operations 121 and 132, the pinch roller moving operations 123 and 134, and the head cleaner moving operations 124 and 135 correspond to common operations, and are realized by rotating the common operations motor 40 in a clockwise direction.

The poles P4(4) and P5(4) moving operations 121 correspond to operations unique to the conventional tape cassette 10. The poles P1, P5(8), P8, and P9 raising operations 131, and the poles P5(8), P8, and P4(8) moving operations 133 correspond to operations unique to the new tape cassette 20. These operations are realized by rotating the individual operations motor 50. Specifically, the operations 122 that are unique to the conventional tape cassette 10 are realized by rotating the individual operations motor 50 in a counter-clockwise direction, and the operations 131 and 133 that are unique to the new tape cassette 20 are realized by rotating the individual operations motor 50 in a clockwise direction. It is noted that the circular marks in FIGS. 3 and 4 indicate the motor that is driven and the rotating direction of the operating motor in each of the operations 121~124 and 131~135.

Figure 5:
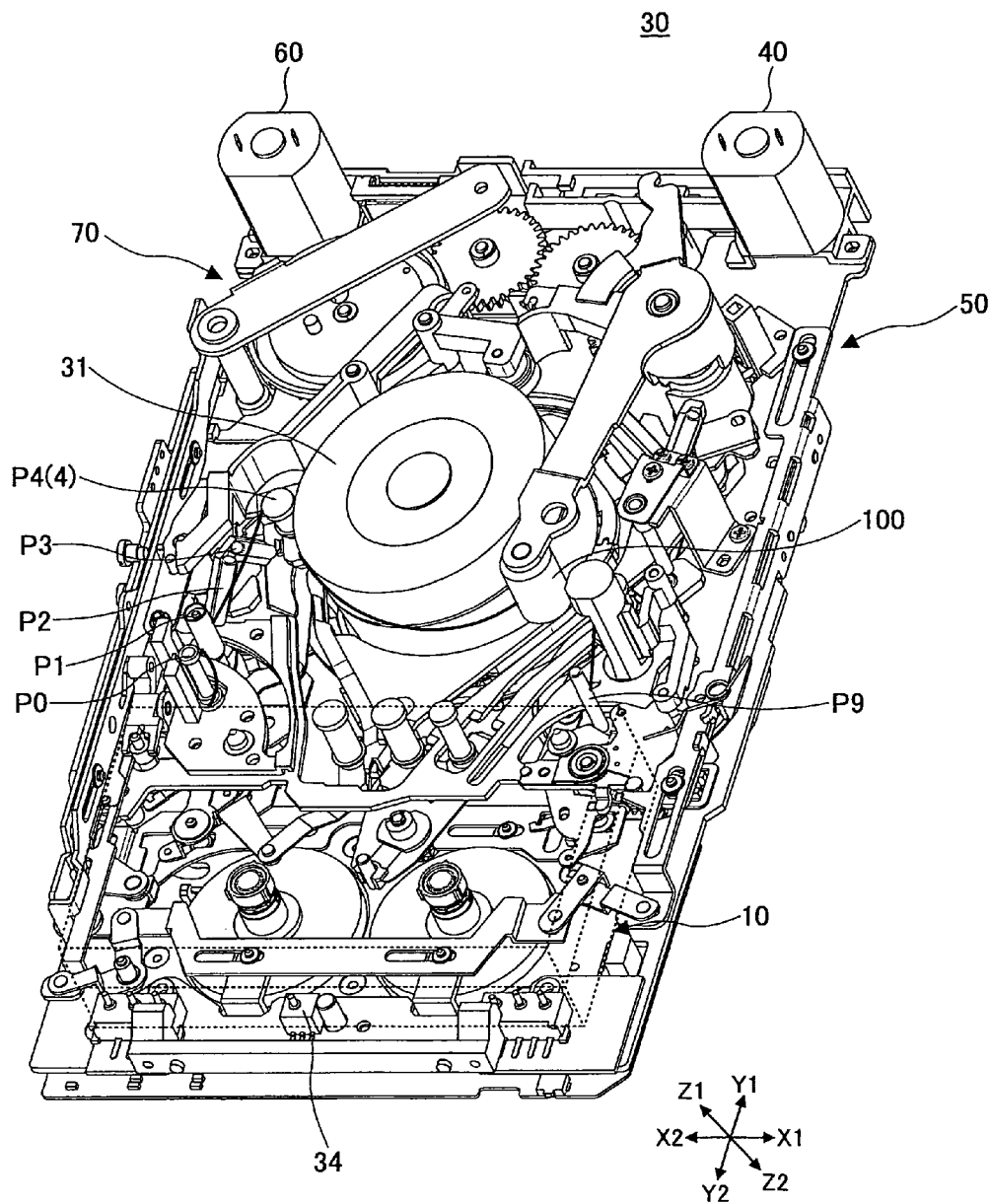
FIG. 5 is a diagram showing the state of the streamer device after the tape loading operations for the conventional tape cassette are completed.
Figure 7B:
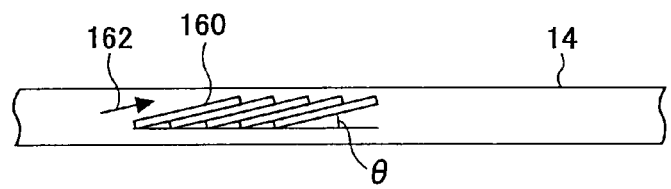
Figure 11:
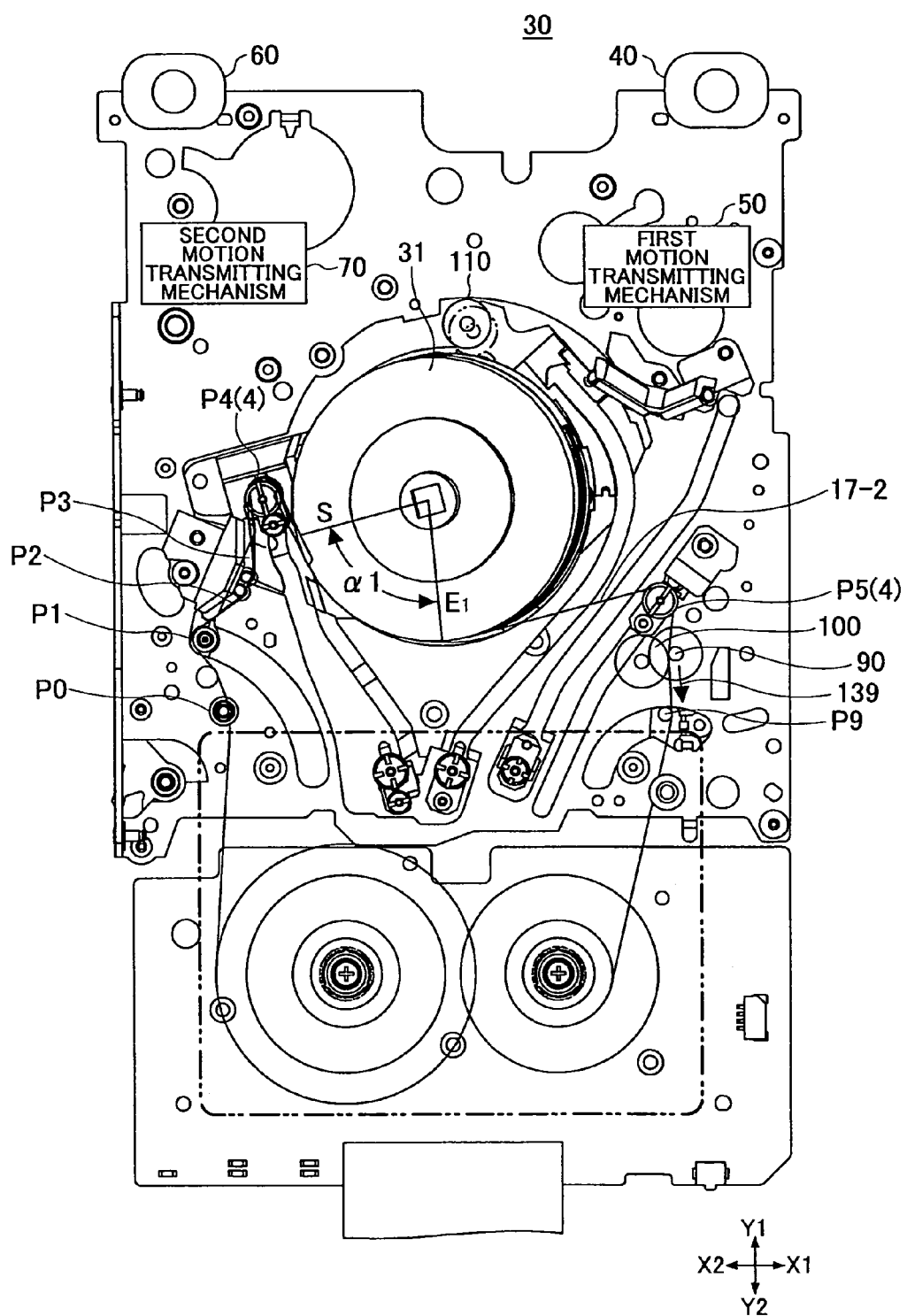
FIG. 11 is a diagram illustrating the state of the streamer device after a third operations step of FIG. 3 is completed.

FIGS. 5 and 11 are diagrams illustrating the state of the streamer device 30 after the conventional tape cassette 10 is loaded into the streamer device 30 and the tape loading operations 121, 122, and 123 of FIG. 3 are performed. As is shown in the drawings, the magnetic tape 14 forms a tape path 17-2 (see FIG. 11). Also, as is shown in conjunction with FIG. 7A, the magnetic tape 14 is guided by the tape guide 31c to be wound onto the rotating drum unit 31 over a winding angle α1 from a start position S to an end position E1 (e.g., around 90 degrees) in a diagonal direction, and as is shown in FIG. 7B, a rotating head scans the magnetic tape 14 in a direction indicated by arrow 162 so that information may be recorded on the magnetic tape 14 in the form of a track pattern 160 with angle θ. It is noted that the track pattern 160 corresponds to a track pattern with lower compatibility that is identical to the type of track pattern formed by a conventional streamer device. FIG. 7B shows the opposite side of the magnetic film surface of the magnetic tape 14; that is, the Y2 side of the magnetic tape 14. The angle α1 corresponds to an angle range required for forming the track pattern 160 across substantially the entire width of the magnetic tape 14. The arrow 162 indicates the direction in which the rotating head scans the magnetic tape 14.

Figure 6:
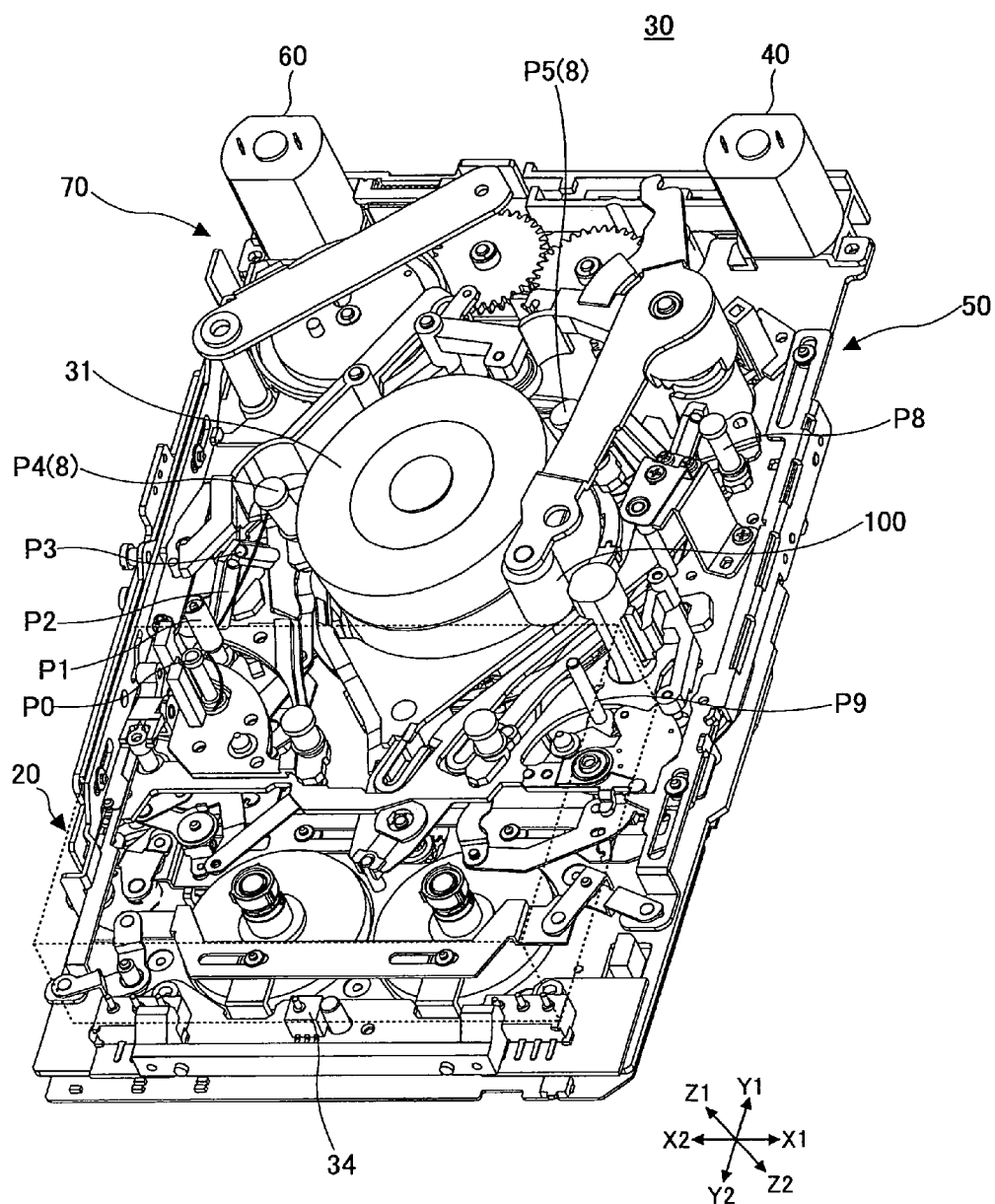
FIG. 6 is a diagram showing the state of the streamer device after the tape loading operations for the new tape cassette are completed.
Figure 7C:
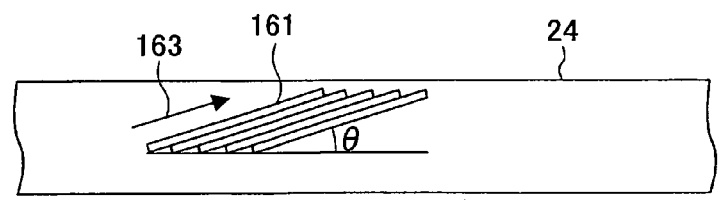
Figure 18:
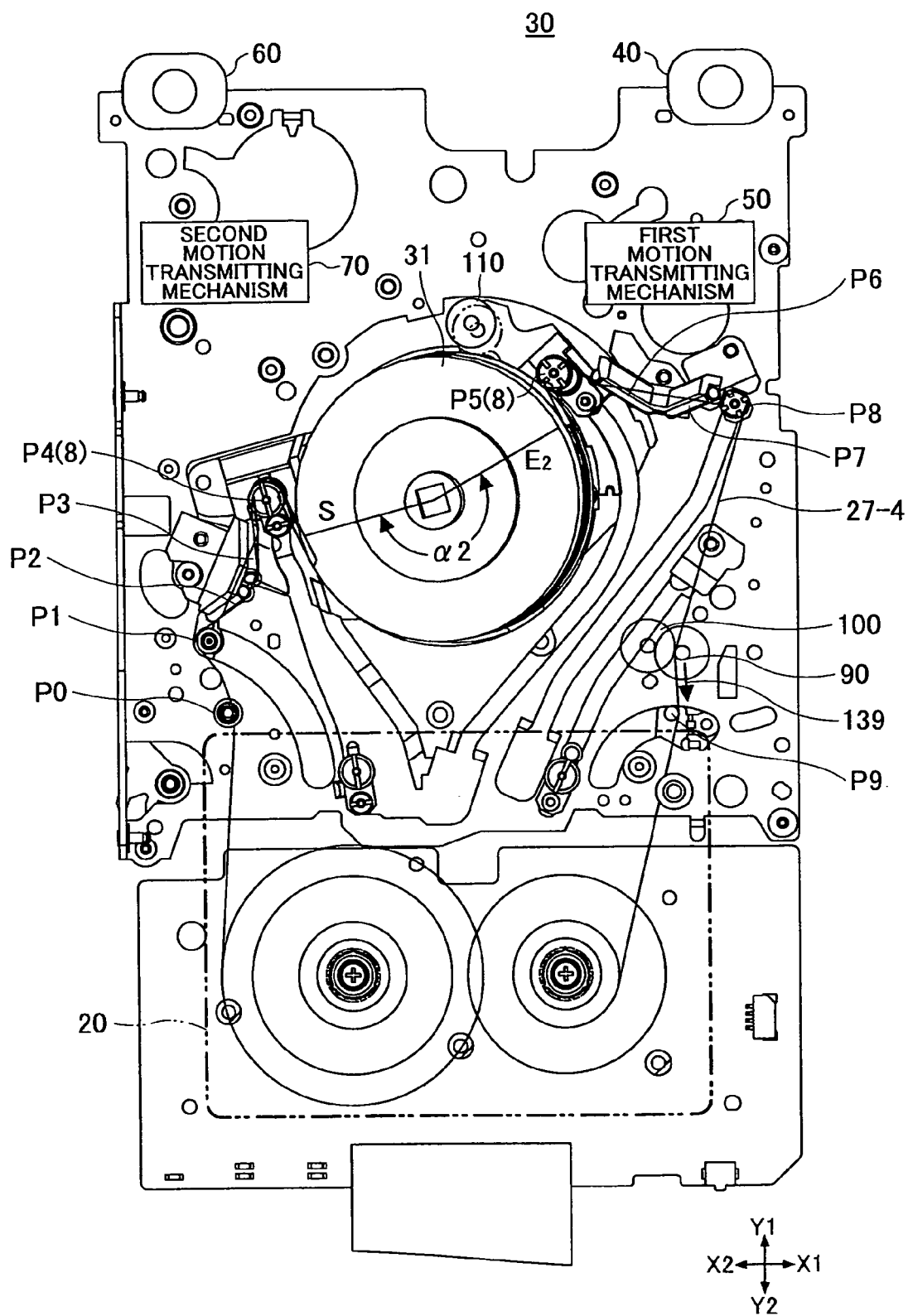
FIG. 18 is a diagram illustrating the state of the streamer device after a fourth operations step of FIG. 4 is completed.

FIGS. 6 and 18 illustrate the state of the streamer device 30 after the new tape cassette 20 is loaded and the tape loading operations 131, 132, 133, and 134 of FIG. 4 are performed. As is shown in the drawings, the magnetic tape 24 forms a tape path 27-4 (see FIG. 18). Also, as is shown in conjunction with FIG. 7A, the magnetic tape 24 is guided by the tape guide 31c to be wound onto the rotating drum unit 31 over a winding angel α2 from a start position S to an end position E2 (e.g., around 180 degrees) in a diagonal direction, and as is shown in FIG. 7C, the rotating head scans the magnetic tape 24 in a direction indicated by arrow 163 to record information on the magnetic tape 24 in the form of a track pattern 161 with angle θ. The track pattern 161 corresponds to an extended track pattern of the track pattern 160, and in this way, the recording capacity of the new tape cassette 20 is increased with respect to that of the conventional tape cassette 10. It is noted that FIG. 7C shows the opposite side of a magnetic film surface of the magnetic tape 24. The angle α2 corresponds to an angle range required for forming the track pattern 161 across substantially the entire width of the magnetic tape 24. The direction of arrow 163 shown in FIG. 7C corresponds to the direction of arrow 162 shown in FIG. 7B.

It is noted that the winding start position S for winding the magnetic tape 14 onto the rotating drum unit 31 and the winding start position S for winding the magnetic tape 24 onto the rotating drum unit 31 correspond to the same position.

4. [Tape Loading Operations for Conventional Tape Cassette 10]

In the following, tape loading operations performed in a case where the conventional tape cassette 10 is loaded are described with reference to FIGS. 8 through 11.

Referring to FIG. 2, it is noted that the streamer device 30 includes paths 140~145 through which the corresponding poles may move, and stoppers 151, 152, and 154.

Figure 8A:
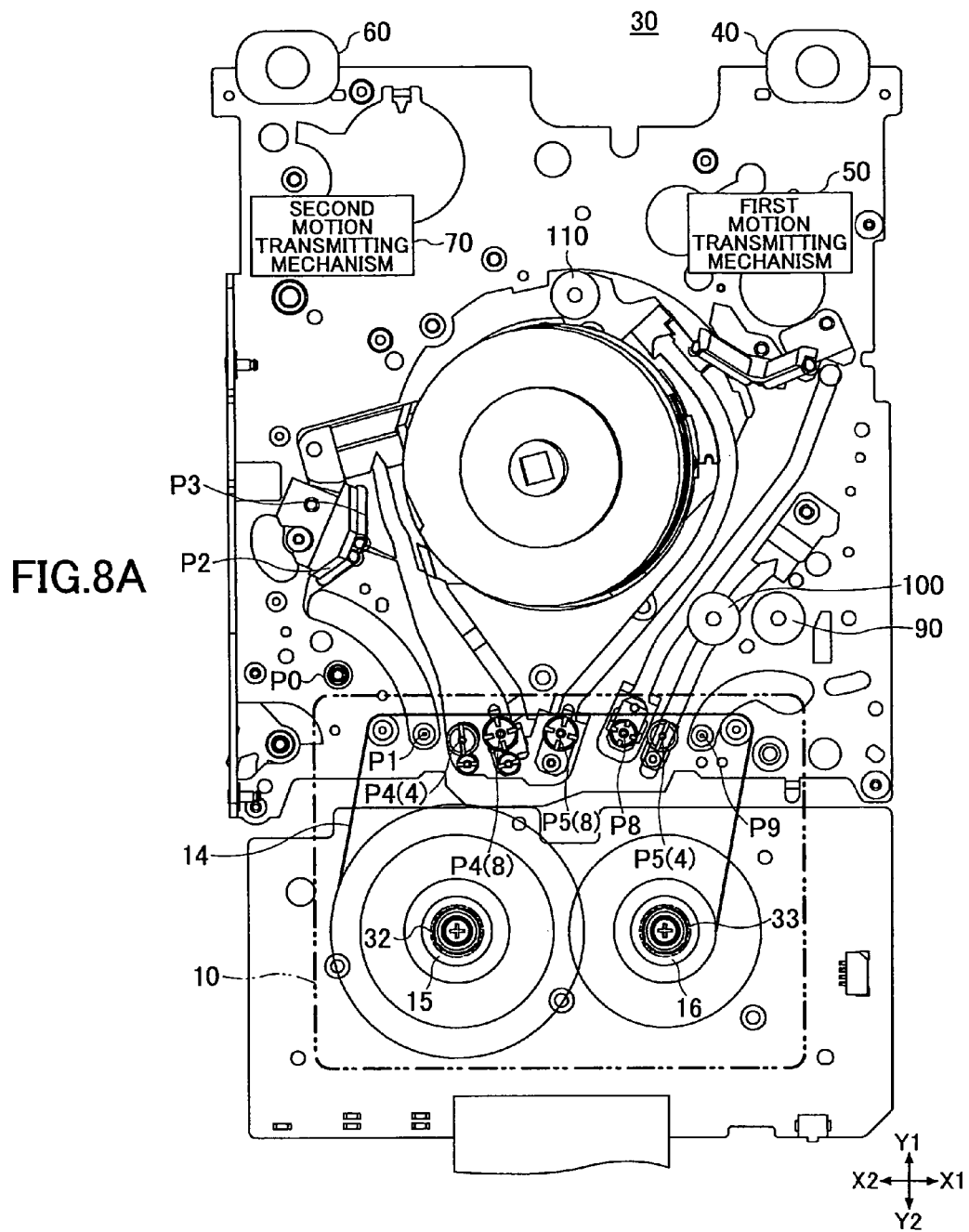
FIGS. 8A and 8B are diagrams illustrating the state of the streamer device when the conventional tape cassette is loaded.
Figure 8B:
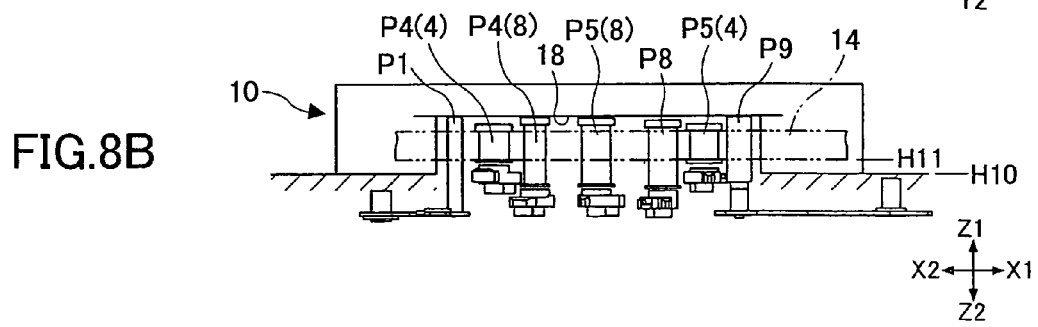

FIGS. 8A and 8B illustrate the state of the streamer device 30 when the conventional tape cassette 10 is loaded thereto. As is shown in FIG. 8B, the bottom surface of the conventional tape cassette 10 is set to height H10 upon being loaded. When the conventional tape cassette 10 is loaded, the slide board (not shown) is slid, the supply reel 15 and the winding reel 16 are engaged by the supply reel axle unit 32 and the winding reel axle unit 33, respectively, the lid 12 is opened, and the poles P1, P4(4), P4(8), P5(8), P8, P5(4), and P9 enter the pole accommodating space 18. The tape cassette identifying switch 32 is pushed by the cassette body 13, and the conventional cassette recognition operation 120 is performed.

Figure 9:
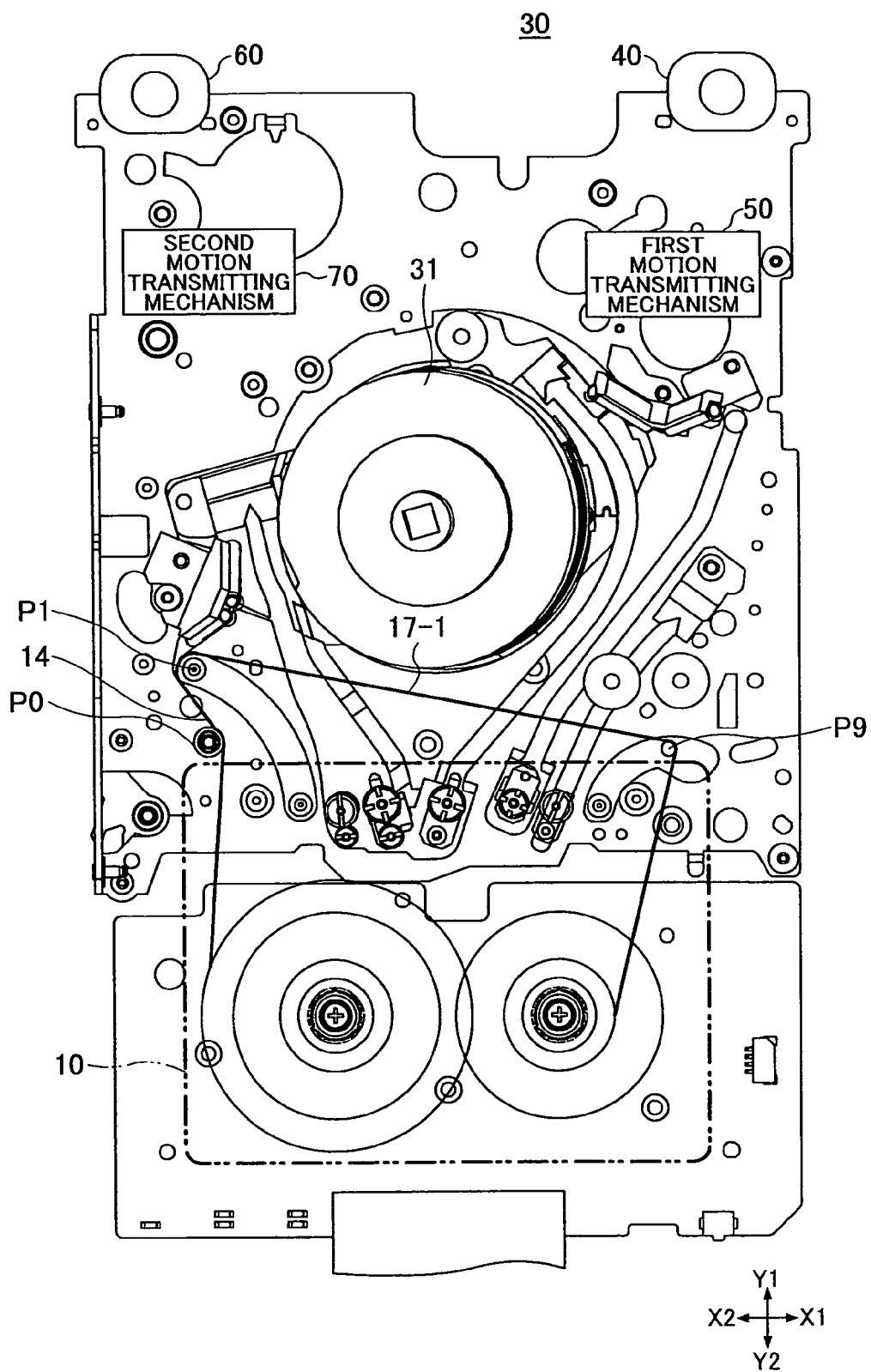
FIG. 9 is a diagram illustrating the state of the streamer device after a first operations step of FIG. 3 is completed.

In response to the conventional cassette recognition operation 120, first, as is shown in FIG. 9, the poles P1 and P9 moving operations 121 are performed. In FIG. 9, the common operations motor 40 is rotated in a clockwise direction to operate the first motion transmitting mechanism 50. Accordingly, the pole P1 is moved toward the X2 direction, the pole P9 is moved toward the X1 direction, and the magnetic tape 14 is pulled out of the tape cassette 10 to form a first tape path 17-1.

Figure 10:
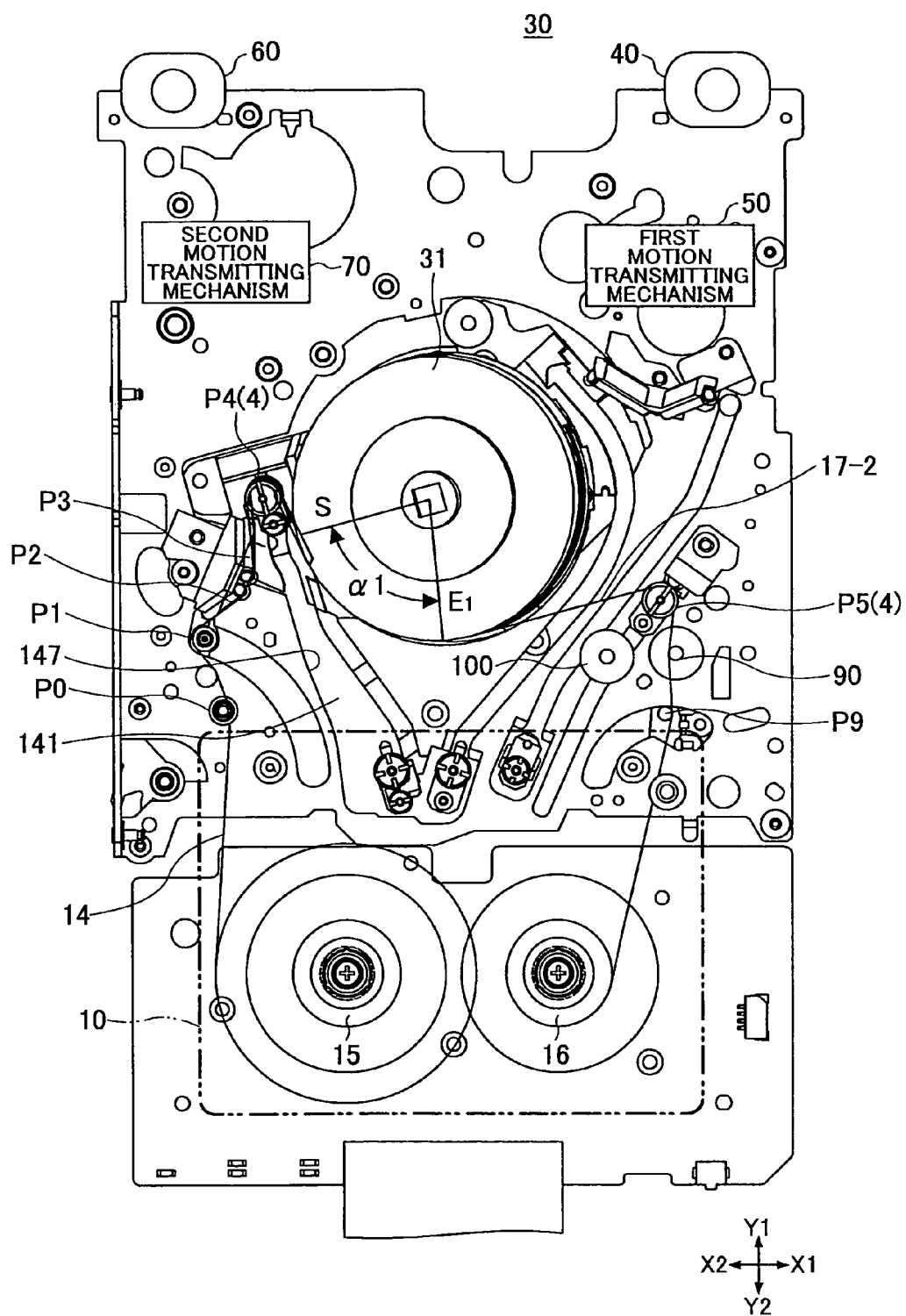
FIG. 10 is a diagram illustrating the state of the streamer device after a second operations step of FIG. 3 is completed.

Then, as is shown in FIG. 10, the poles P4(4) and P5(4) moving operations 122 are performed. In FIG. 10, the individual operations motor 60 is rotated in a clockwise direction to operate the second motion transmitting mechanism 70. Accordingly, the pole P4(4) engages a guide rail portion 147 at the X2 side of the path 141 (see FIG. 28), and moves along the path 141 toward the Y1 direction until reaching the stopper 151. The pole P5(4) is moved along the path 144 toward the Y1 direction until reaching stopper 154. Then, the poles P4(4) and P5(4) pull the magnetic tape 14 further to extend the tape path 17-1. In turn, the magnetic tape 14 is wound around the rotating drum unit 31 over an angle α1 from the position S to the position E1 in a diagonal direction, and comes into contact with the capstan 90 to form a second tape path 17-2. It is noted that the pole P5(4) and the magnetic tape 14 pass on the Z2 side of the pinch roller 100 so as to avoid interfering with the pinch roller 100.

In the second tape path 17-2, the magnetic tape 14 extends from the supply reel 15 of the conventional tape cassette 10, is guided by the poles P0 and P1, is guided and twisted by the poles P2 and P3, is wound onto the rotating drum unit 31 between the poles P4(4) and P5(4), and is guided by the capstan 90 and the pole P9 to enter the winding reel 16 of the conventional tape cassette 10.

Then, as is shown in FIG. 11, the pinch roller moving operation 123 is performed. In FIG. 11, the common operations motor 40 is rotated in a clockwise direction to operate the first motion transmitting mechanism 50. Accordingly, the pinch roller 100 is moved downward toward the Z2 direction and enters the second tape path 17-2. Then, the pinch roller 100 is moved in the X1 direction to be pushed toward the capstan 90, and the magnetic tape 14 starts running in a direction indicated by arrow 139 so that an information recording or reproducing operation may be started.

It is noted that in the illustrated embodiment, the magnetic tape 14 is wound onto the rotating drum unit 31 until reaching the winding end position E1. The magnetic tape 14 is separated from the peripheral surface of the rotating drum unit 31 immediately before the rotating head scanning the magnetic tape 14 in a diagonal direction reaches the top edge of the magnetic tape 14. Such an arrangement prevents the rotating head from scanning across the top edge of the magnetic tape 14, and thereby, prevents damage of the magnetic tape 14 resulting from the rotating head scanning across the top edge of the magnetic tape 14.

Then, the head cleaner moving operation 124 is performed. As is shown in FIG. 11, the common operations motor 40 is rotated in a clockwise direction to operate the first motion transmitting mechanism 50. Accordingly, the head cleaner 110 is moved to a position indicated by a two-dotted line in the drawing to come into contact with the rotating drum unit 31, and the rotating head is thus cleaned.

It is noted that tape unloading operations are realized by performing the above-described operations in reverse order, in each of which operations the components being moved are moved in reverse directions with respect to the moving directions indicated above.

5. [Tape Loading Operations for New Tape Cassette 20]

In the following, tape loading operations that are performed in a case where the new tape cassette 20 is loaded into the streamer device 30 are described with reference to FIGS. 12 through 18.

Figure 12A:
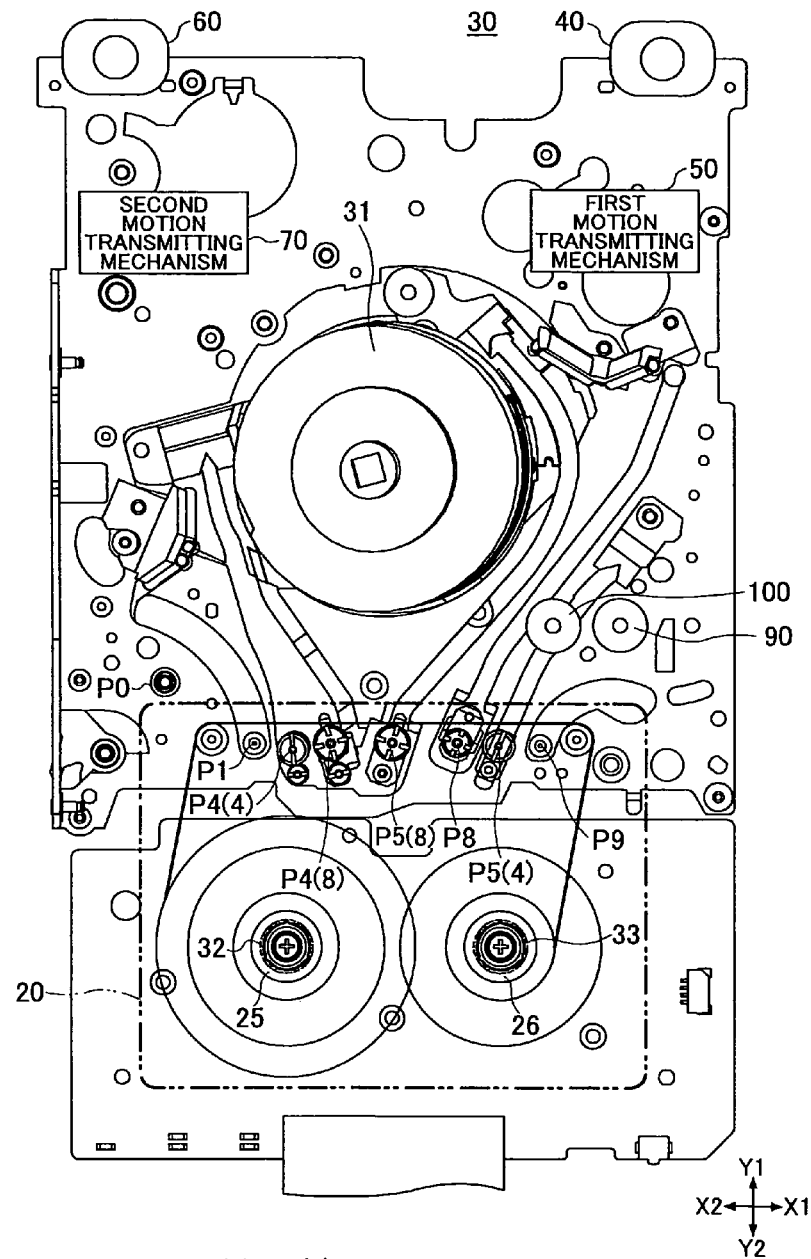
FIGS. 12A and 12B are diagrams illustrating the state of the streamer device when the new tape cassette is loaded.
Figure 12B:
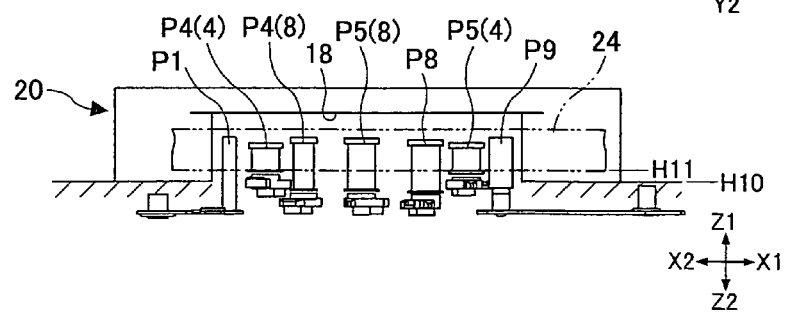

FIGS. 12A and 12B illustrate the state of the streamer device 30 when the new tape cassette 20 is loaded thereto. As is shown in FIG. 12B, the bottom surface of the new tape cassette 20 is set to height H10 upon being loaded. When the new tape cassette 20 is loaded, the slide board (not shown) is slid, the supply reel 25 and the winding reel 26 are engaged by the supply reel axle unit 32 and the winding reel axle unit 33, respectively, the lid 22 is opened, and the poles P1, P4(4), P4(8), P5(8), P8, P5(4), and P9 enter the pole accommodating space 28. In this case, the recessed portion 29 is arranged to face against the tape cassette identifying switch 32 so that the tape identifying switch 32 is not pushed, and thus, the new cassette recognition operation 130 is performed. Also, it is noted that when the new tape cassette 20 is loaded, the bottom edge of the magnetic tape 24 is positioned at height H11, which corresponds to the loaded height position of the bottom edge of the magnetic tape 14 of the conventional tape cassette 10.

Figure 13A:
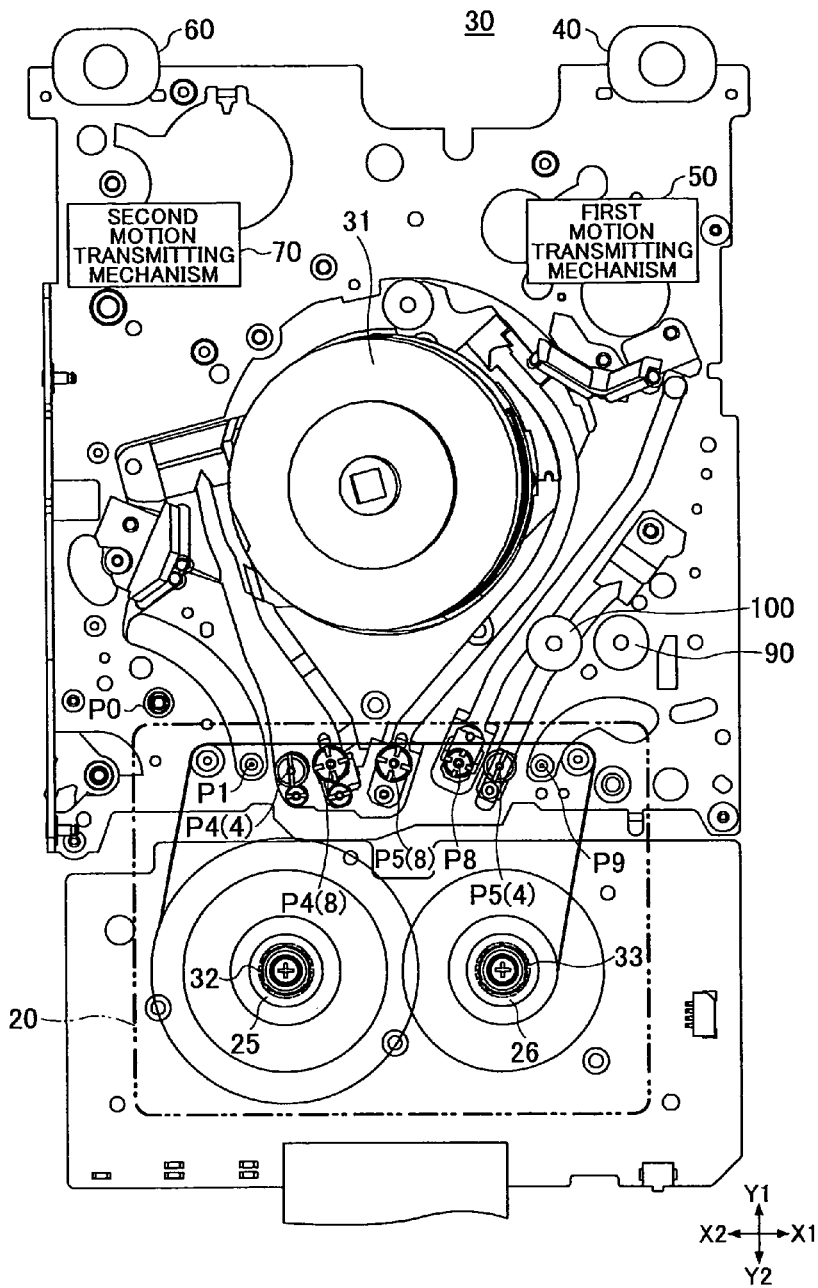
FIGS. 13A and 13B are diagrams illustrating the state of the streamer device when a first operations step of FIG. 4 is completed.
Figure 13B:
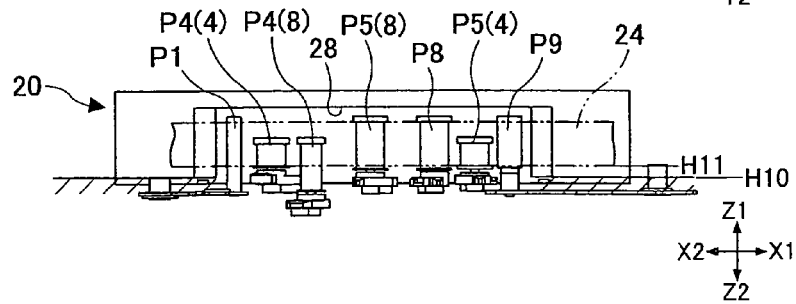

In response to the new cassette recognition operation 130, first, as is shown in FIGS. 13A and 13B, the poles P1, P5(8), P8, and P9 raising operations 131 are performed. In FIGS. 13A and 13B, the individual operations motor 60 is rotated in a counter-clockwise direction so that the second motion transmitting mechanism 70 is operated. Accordingly, a pole raising/lowering mechanism 280 and other related components (see FIG. 30) are operated so that the poles P1, P5 (8), P8, and P9 may be raised in the Z1 direction within the pole accommodating space 28 to span across substantially the entire width of the 8 mm-width magnetic tape 24. It is noted that when the poles are not arranged to face against the entire width of the magnetic tape 24 upon engaging with the magnetic tape 24 to pull the magnetic tape 24 out of the new tape cassette 20, the engagement between the poles and the magnetic tape 24 may be unstable to thereby cause damage to the magnetic tape 24. On the other hand, when the poles P1, P5 (8), P8, and P9 are arranged to face against the entire width of the 8 mm-width magnetic tape 24, the magnetic tape 24 may be engaged without causing damage thereto.

It is noted that the upper ends of the moving poles P1, P4(4), P4(8), P5(8), P8, P5(4), and P9 are arranged to be positioned at the same height, and the longer poles P1, P4(8), P5(8), P8, and P9 are normally set to lowered positions (in the Z2 direction) so that the conventional tape cassette 10 may be loaded at the same height as the loading height position of the new tape cassette 20 without interfering with the longer poles P1, P4(8), P5 (8), P8, and P9. Accordingly the operations 131 are performed when the new tape cassette 20 is loaded into the streamer device 30 so as to adjust the heights of the poles for use in the new tape cassette loading operations.

Figure 14:
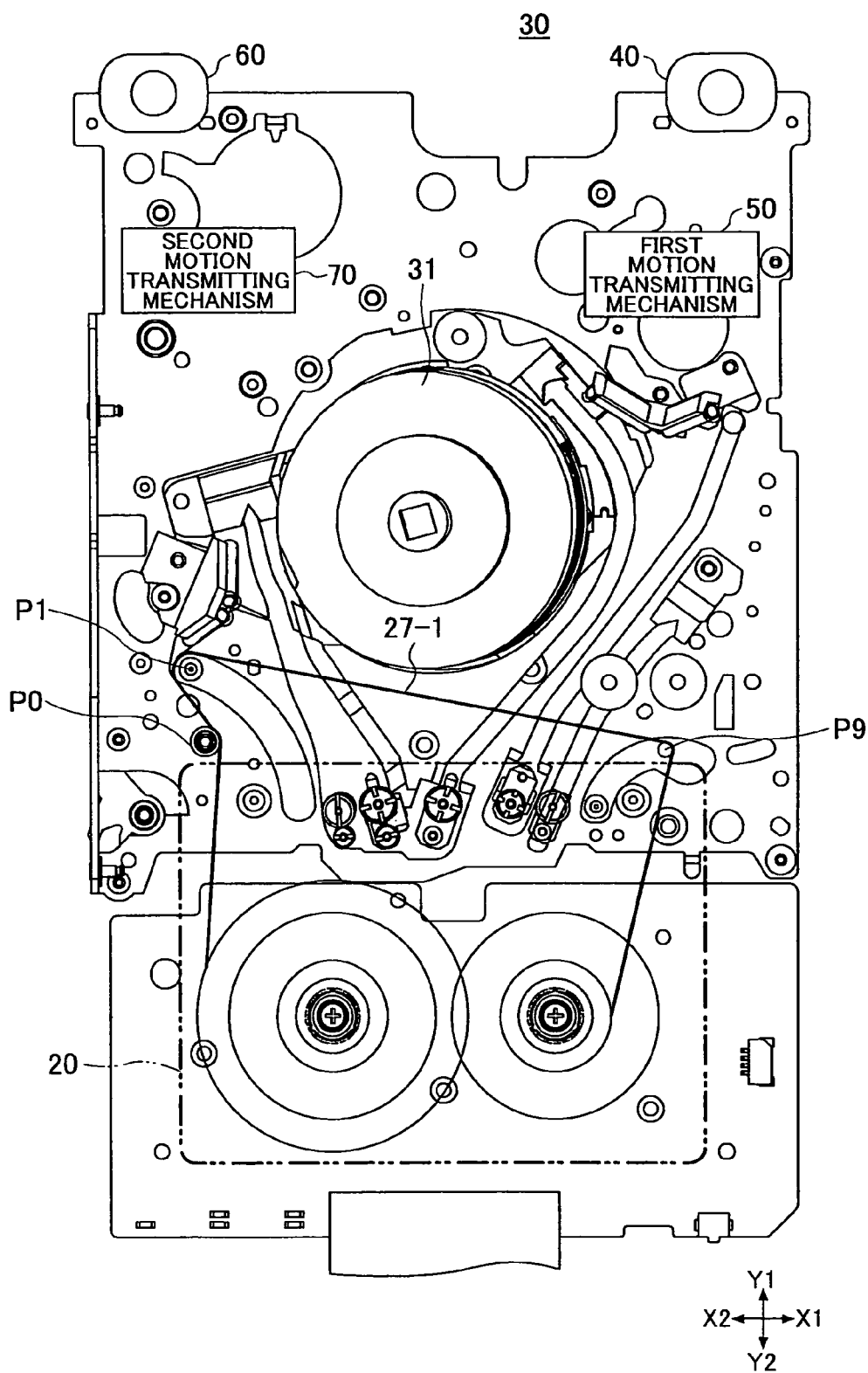
FIG. 14 is a diagram illustrating the state of the streamer device after a second operations step of FIG. 4 is completed.

Then, as is shown in FIG. 14, the poles P1 and P9 moving operations 132 are performed. In FIG. 14, the common operations motor 40 is rotated in a clockwise direction to operate the first motion transmitting mechanism 50. Accordingly, the pole P1 is moved toward the X2 direction, the pole P9 is moved toward the X1 direction, and the magnetic tape 24 is pulled out of the tape cassette 20 to form a first tape path 27-1.

Figure 15:
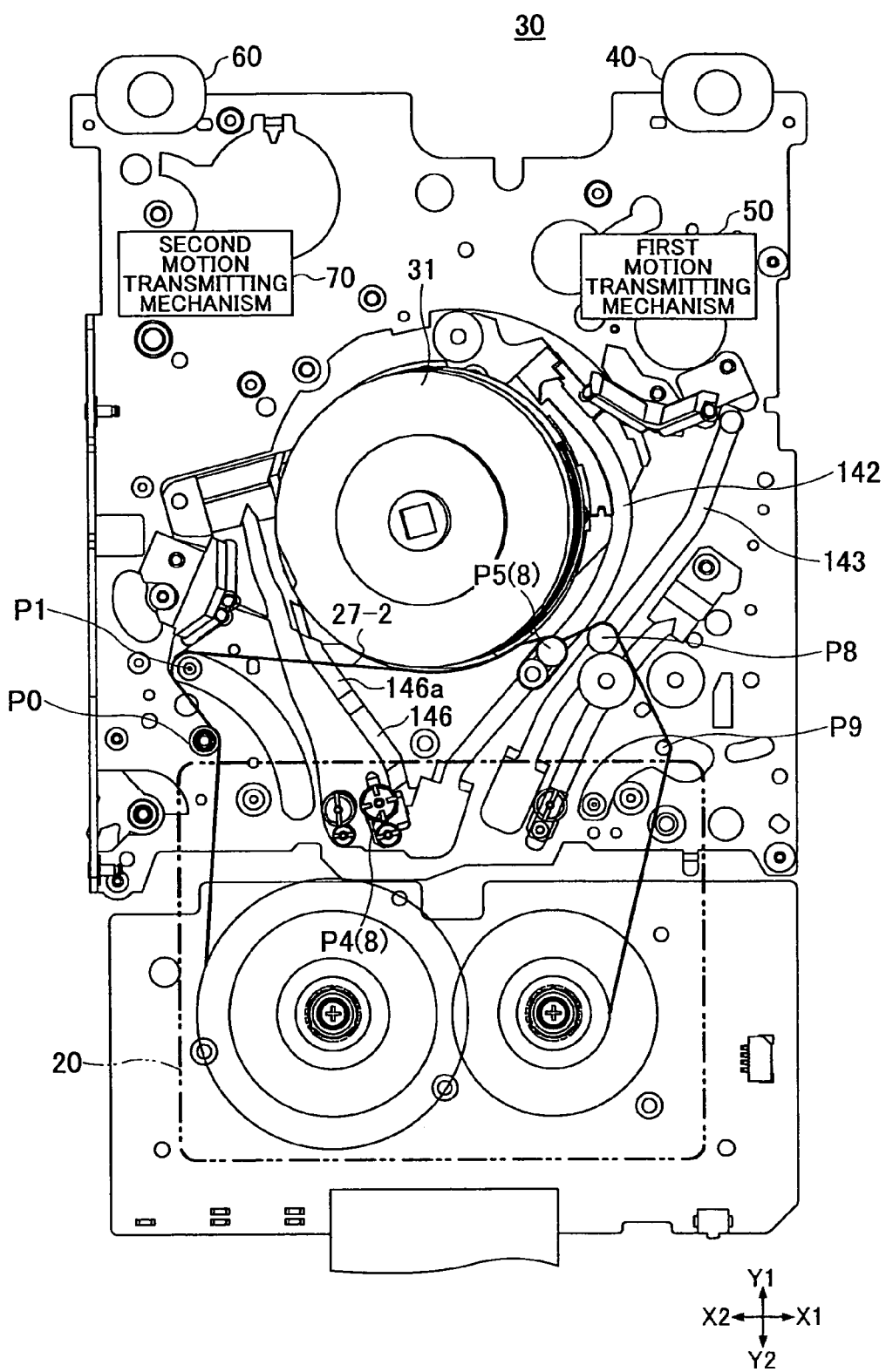
FIG. 15 is a diagram illustrating the state of the streamer device when a third operations step of FIG. 4 is being performed.
Figure 16:
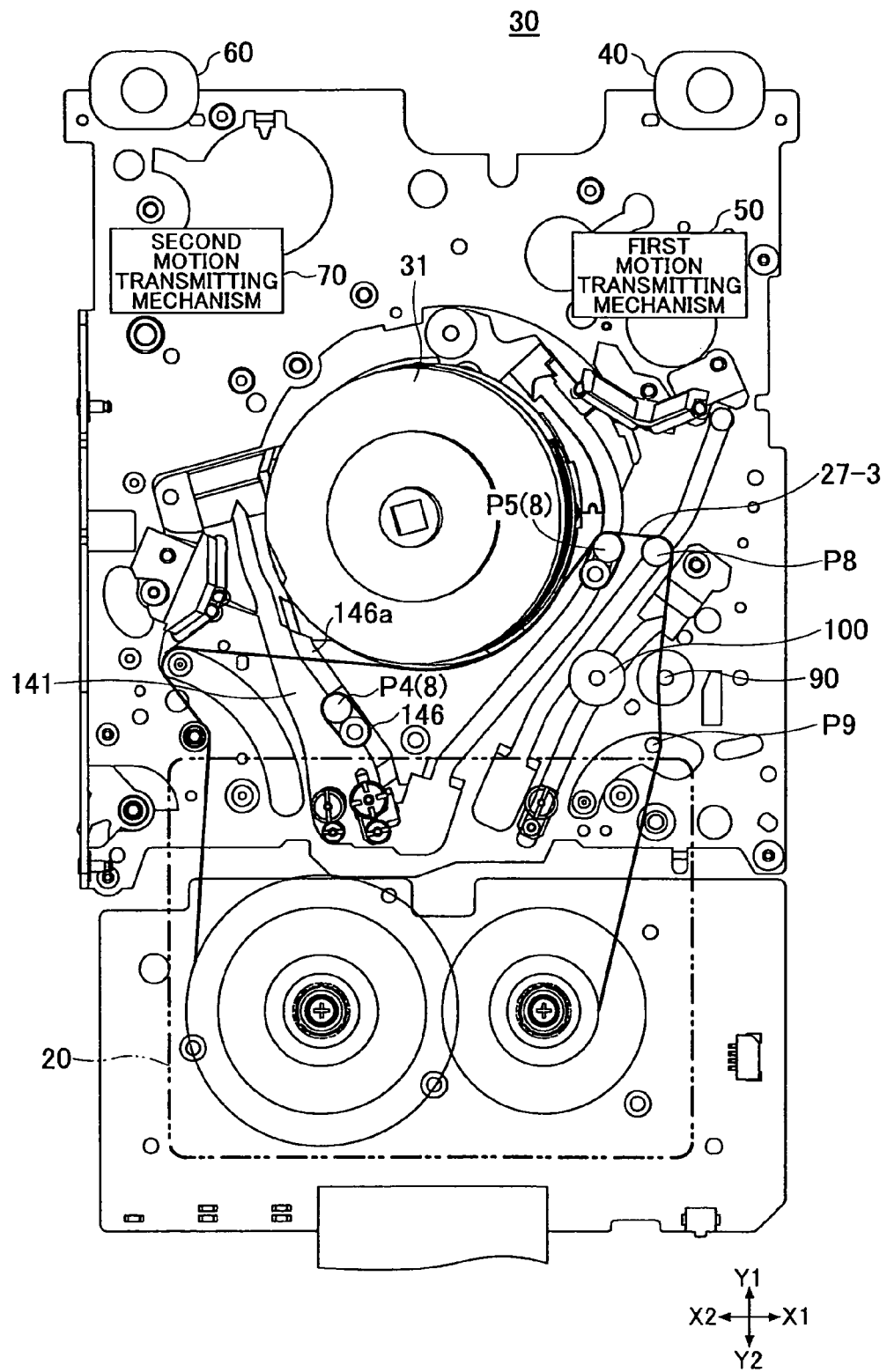
FIG. 16 is another diagram illustrating the state of the streamer device when the third operations step of FIG. 4 is being performed.

Then, the P5(8), P8, and P4(8) moving operations are performed. First, as is shown in FIG. 15, the individual operations motor 60 is rotated in a counter-clockwise direction to operate the second motion transmitting mechanism 70. Accordingly, the poles P5(8) and P8 are moved toward the Y1 direction along paths 142 and 143, respectively, to pull out the magnetic tape 24 further. In turn, the first tape path 27-1 is extended so that the magnetic tape 24 comes into contact with the rotating drum unit 31 to form a second tape path 27-2. Then, as is shown in FIG. 16, after a certain delay, the pole P4(8) is moved toward the Y1 direction. The pole P4(8) engages a guide rail portion 146 at the X1 side of path 141 to be moved along this guide rail portion 146 toward the Y1 direction. The guide rail portion 146 includes a sloped portion 146a sloping in the Z1 direction, and the pole P4(8) is raised in the Z1 direction while being moved toward the Y1 direction to be arranged at a height corresponding to the width of the magnetic tape 24. The pole P4(8) moves toward the Y1 direction to engage the magnetic tape 24, and continues moving with the magnetic tape 24 engaged thereto.

In the following, the reason for delaying the start of the operation for moving the pole P4(8) is explained. First, in order to reduce the size of the streamer device 30, a dedicated path is not provided for the pole P4(8), and the pole P4(8) uses the path 141, which is also used by the pole P4(4). Second, in this respect, the pole P4(8) is arranged to be raised while being moved. Third, the magnetic tape 24 is preferably distanced as far away (in the Y1 direction) as possible from the new tape cassette 20 so that the pole P4(8) may be completely raised before reaching the magnetic tape 24.

Figure 17:
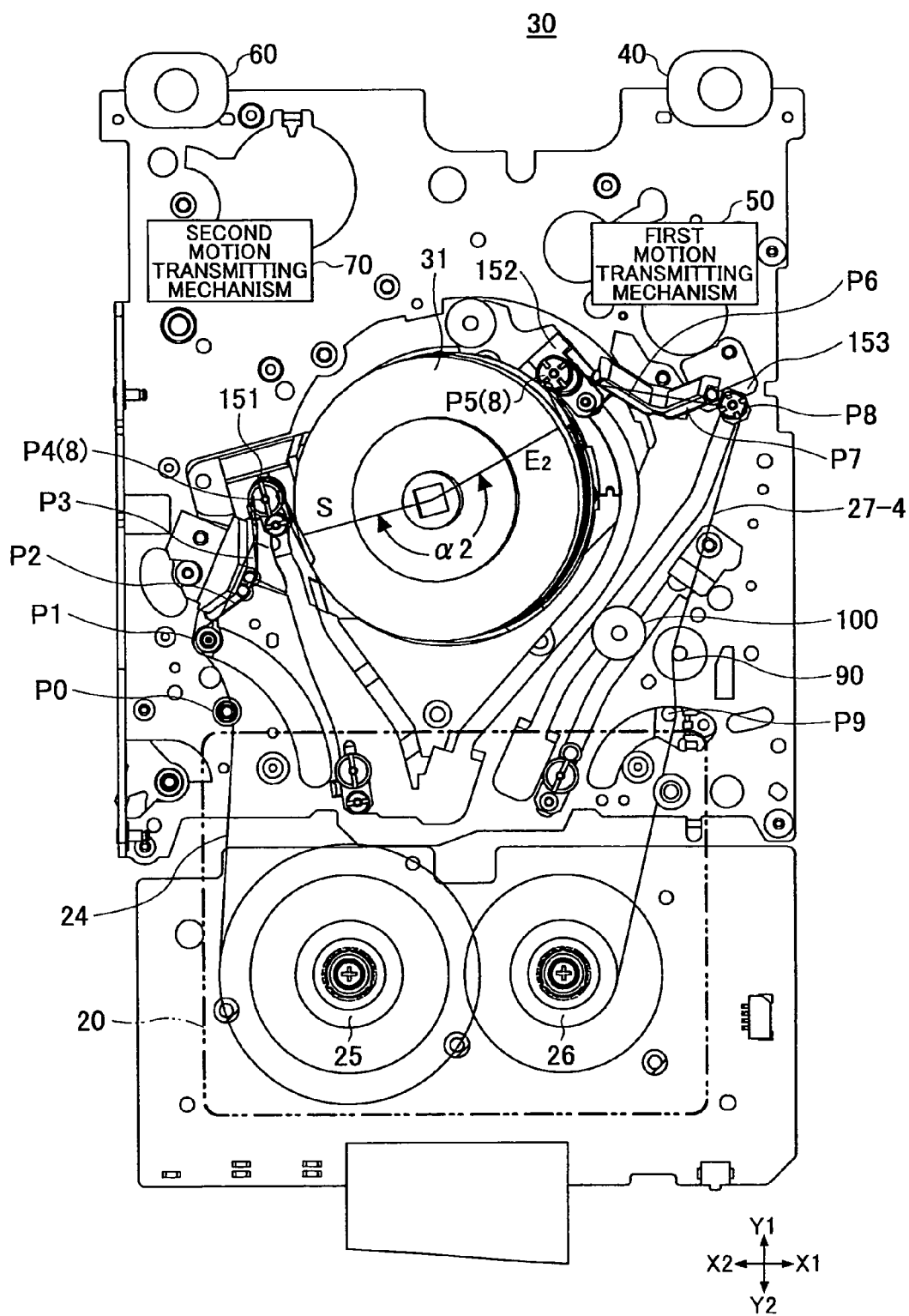
FIG. 17 is a diagram illustrating the state of the streamer device after the third operations step of FIG. 4 is completed.

As is shown in FIG. 17, the poles P4(8), P5(8), and P8 reach the stoppers 151, 152, and 153, respectively, at substantially the same time. The second tape path 27-2 is further extended to form a third tape path 27-3 as is shown in FIG. 16, which third tape path 27-3 is further extended so that the magnetic tape 24 is wound around the rotating drum unit 31 over a winding angle α2 from the start position S to the end position E2 in a diagonal direction and comes into contact with the capstan 90 to form a fourth tape path 27-4 as is shown in FIG. 17. It is noted that the pole P8 and the magnetic tape 24 pass the Z2 side of the pinch roller 100 without interfering with the pinch roller 100.

In the fourth tape path 27-4, the magnetic tape 24 extends from the supply reel 25 side of the new tape cassette 20, is guided by the poles P0 and P1, is guided and twisted by the poles P2 and P3, is wound onto the rotating drum unit 31 between the poles P4(8) and P5(8), is guided and twisted by the poles P6 and P7, and is guided by the pole P8, the capstan 90, and the pole P9, to then enter the winding reel 26 of the new tape cassette 20.

Then, as is shown in FIG. 18, the pinch roller moving operation 134 is performed. In FIG. 18, the common operations motor 40 is rotated in a clockwise direction to operate the first motion transmitting mechanism 50. Accordingly, the pinch roller 100 is moved downward toward the Z2 direction and enters the fourth tape path 27-4. Then, the pinch roller 100 is moved in the X1 direction to be pushed toward the capstan 90, and the magnetic tape 24 starts running in the direction indicated by arrow 139 so that an information recording or reproducing operation may be started.

It is noted that in the illustrated embodiment, the magnetic tape 24 is wound onto the rotating drum unit 31 until reaching the winding end position E2. The magnetic tape 24 is separated from the peripheral surface of the rotating drum unit 31 immediately before the rotating head scanning the magnetic tape 24 in a diagonal direction reaches the top edge of the magnetic tape 24. Such an arrangement prevents the rotating head from scanning across the top edge of the magnetic tape 24, and thereby prevents damage of the magnetic tape 24 resulting from the rotating head scanning across the top edge of the magnetic tape 24.

Then, the head cleaner moving operation 135 is performed. As is shown in FIG. 18, the common operations motor 40 is rotated in a clockwise direction to operate the first motion transmitting mechanism 50. Accordingly, the head cleaner 110 is moved to a position indicated by a two-dotted line in the drawing to come into contact with the rotating drum unit 31, and the rotating head is thus cleaned.

It is noted that tape unloading operations are realized by performing the above-described operations in reverse order, in each of which operations the components being moved are moved in reverse directions with respect to the moving directions indicated above.

Also, it is noted that in the illustrated embodiment, the magnetic tape 14/24 is twisted by the stationary poles P2 and P3 before being wound onto the rotating drum unit 31, and the perpendicular pole P4(4/8) moves to pull out the magnetic tape 14/24 and position the magnetic tape 14/24 alongside the rotating drum unit 31 and determines the position of the magnetic tape 14/24 at the entrance side of the rotating drum unit 31. Also, the magnetic tape 14/24 is twisted by the stationary poles P6 and P7 after separating from the rotating drum unit 31, and the pole P5(4/8) moves to pull out the magnetic tape 14/24 and determines the position of the magnetic tape 14/24 at the exit side of the rotating drum unit 31. By realizing such an arrangement, the moving poles P1, P4(4), P4(8), P5(8), P8, P5(4), and P9 may be accommodated within the pole accommodating space 18/28.

6. [Common Operations Mechanism]

In the following, the common operations motor 40, the first motion transmitting mechanism 50, and operations and mechanisms that are controlled by the power transmitted from the first motion transmission mechanism 50 are described.

Figure 19:
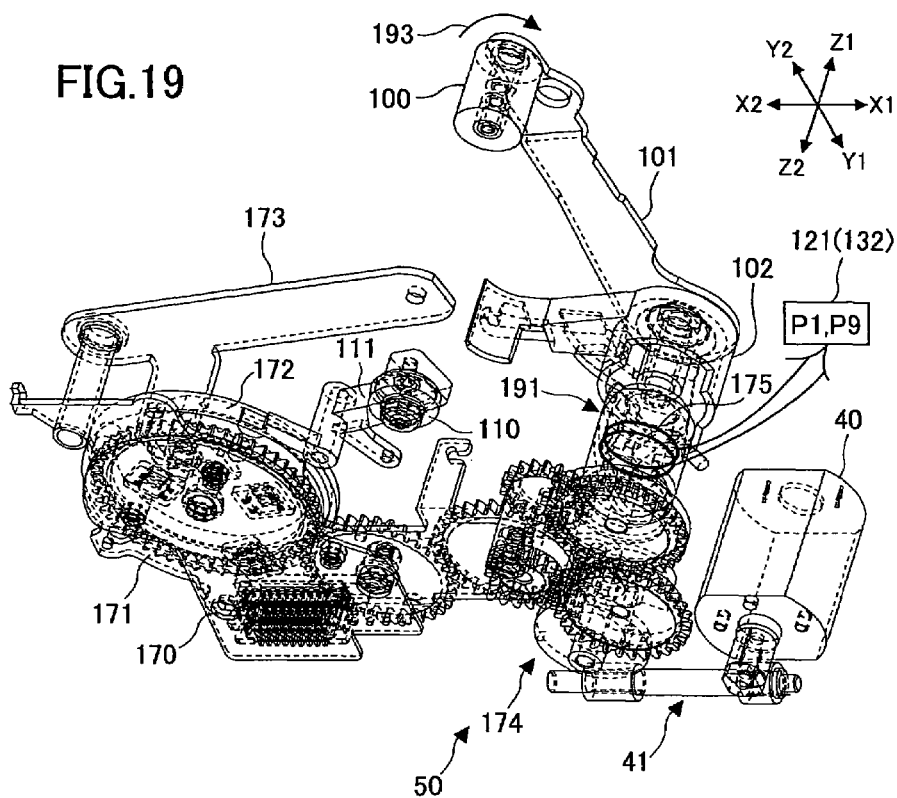
FIG. 19 is a downside perspective view of a first motion transmitting mechanism.

FIG. 19 illustrates the state of the first motion transmitting mechanism 50 when the streamer device 30 is in the state as is illustrated by FIG. 1 (i.e., when a tape cassette is not loaded). FIG. 19 is a downside perspective view of the first motion transmitting mechanism 50. According to this drawing, the first motion transmitting mechanism 50 includes an operation state detection substrate 170 that is provided with plural photo detectors, and a common mode switching gear 171 that has a mode switching pattern formed on its lower surface and a cam 172 provided on its upper surface. The operation state detection substrate 170 optically detects a rotation angle position of the common mode switching gear 171 based on the combination of outputs from the photo detectors, and detects the operation state of the first motion transmitting mechanism 50. In turn, as is shown in FIG. 2, a detection signal is transmitted from the operation state detection substrate 170 to a control circuit 82, and a control signal is transmitted from the control circuit 82 to a motor drive circuit 80 so that the motor drive circuit 80 may be operated. In turn, the common operations motor 40 is activated and deactivated at predetermined timings to perform the poles P1 and P9 moving operations 121, 131, the pinch roller moving operations 123, 134 and the head cleaner moving operations 124, 135 of FIGS. 3 and 4. The first motion transmitting mechanism 50 also includes a tape cassette loading arm 173 that is rotated by the cam unit 172 and is configured to operate a tape cassette loading mechanism (not shown). It is noted that in the illustrated embodiment, the common mode switching gear itself is provided with a mode switching function, and in this way, the mode position may be accurately determined compared to an arrangement in which the mode switching function is provided elsewhere.

7. [Common Operations]

Figure 20:
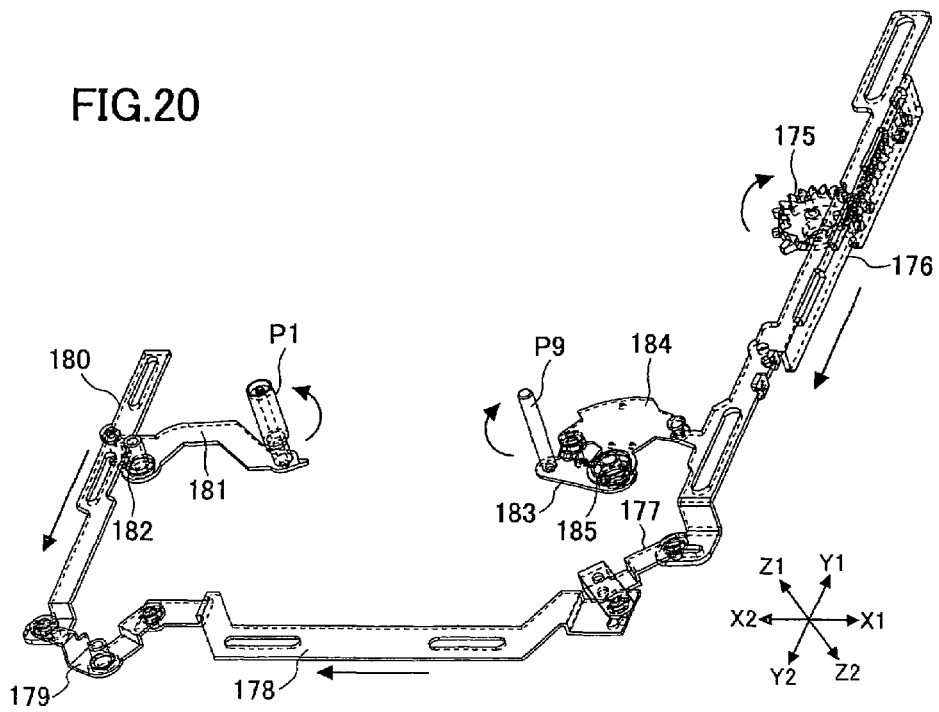
FIG. 20 is a perspective view showing the initial state of a pole moving mechanism.
Figure 21:
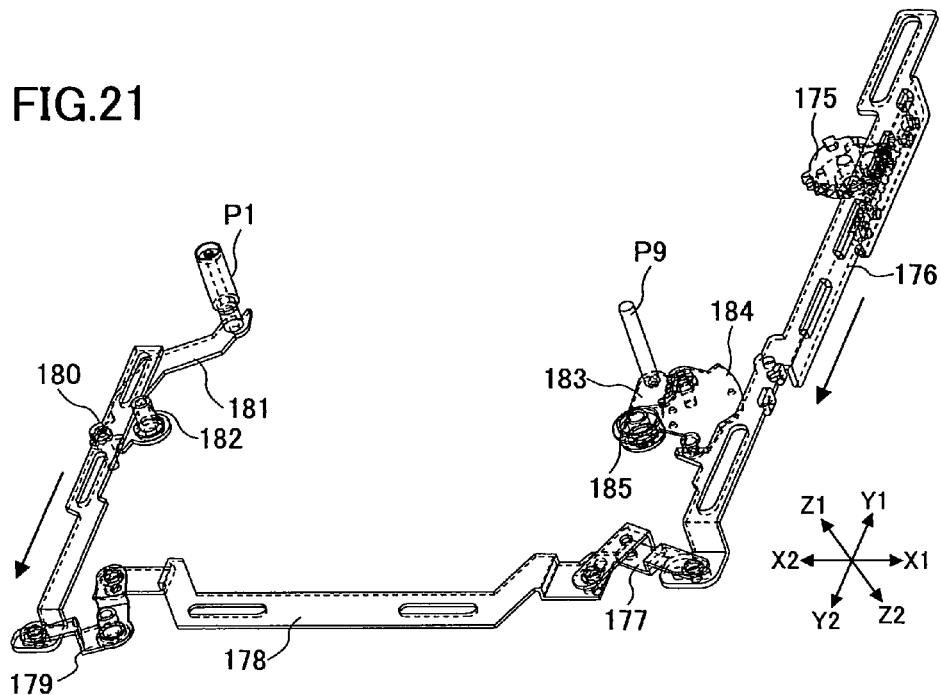
FIG. 21 is a perspective view showing the state of the pole moving mechanism of FIG. 20 when corresponding poles are moved.

[Poles P1 and P9 Moving Operations 121/131] (see FIGS. 20 and 21)

FIGS. 20 and 21 are diagrams showing states of a pole moving mechanism for the poles P1 and P9.

As is shown in FIGS. 20 and 21, the pole P1 is fixed to the tip portion of arm 181. A sleeve 182 is fixed to the base portion of the arm 181, and this sleeve 182 is rotatably and slidably engaged and supported by a stationary post 186 (see FIG. 30) that is fixed to a chassis base. A sleeve 185 is fixed to the base portion of the arm 183, and this sleeve 185 is rotatably and slidably engaged and supported by a stationary post 187 (see FIG. 30) that is fixed to the chassis base.

When the common operations motor 40 is driven, a gear mechanism 174 is driven via a worm gear 41 (see FIG. 19), a drive gear 175 is rotated in a clockwise direction (see FIG. 20), a slide lever 176 is slid in the Y2 direction, and a slide lever 180 is slid in the Y2 direction via a rotating lever 177, a link 178, and a rotating lever 179 (see FIG. 21). In response to the sliding motion of the slide lever 180, the arm 181 is rotated in a counter-clockwise direction around the stationary post 186 and the pole P1 is thus moved. Also, in response to the sliding motion of the slide lever 176, the arms 184 and 183 are rotated in a clockwise direction around the stationary post 187 and the pole P9 is thus moved.

[Pinch Roller Moving Operation 123/134] (see FIG. 19)

When the common operations motor 40 is driven, a cylinder portion 102 at the base of a pinch roller support arm 101 is guided by a perpendicular trench to be lowered in the Z2 direction, and upon reaching the end of the perpendicular trench, the pinch roller support arm 101 is rotated in a direction indicated by arrow 193. In this way, the pinch roller 100 is pushed toward the capstan 90.

[Head Cleaner Moving Operation 124/135] (see FIG. 19)

When the common operations motor 40 is driven, the common mode switching gear 171 is rotated, and an arm member 111 is rotated by the cam 172 that is provided at the common mode switching gear 171 so that the head cleaner 110 is moved to come into contact with the rotating drum unit 31.

It is noted that after the common mode switching gear 171 is rotated and the head cleaner 110 is moved accordingly, the common mode switching gear 171 may be rotated in a reverse direction, and the above described operations may be performed in reverse order (i.e., 124/135, 123/134, 121/131) in which case the components moved in each operation are moved in reverse directions with respect to the moving directions indicated above. In this way, the mechanisms described above may be set back to their initial states.

8. [Individual Operations Mechanism]

In the following, the individual operations motor 60, the second motion transmitting mechanism 70, and operations and mechanisms controlled by the power transmitted from the second motion transmitting mechanism are described.

Figure 22:
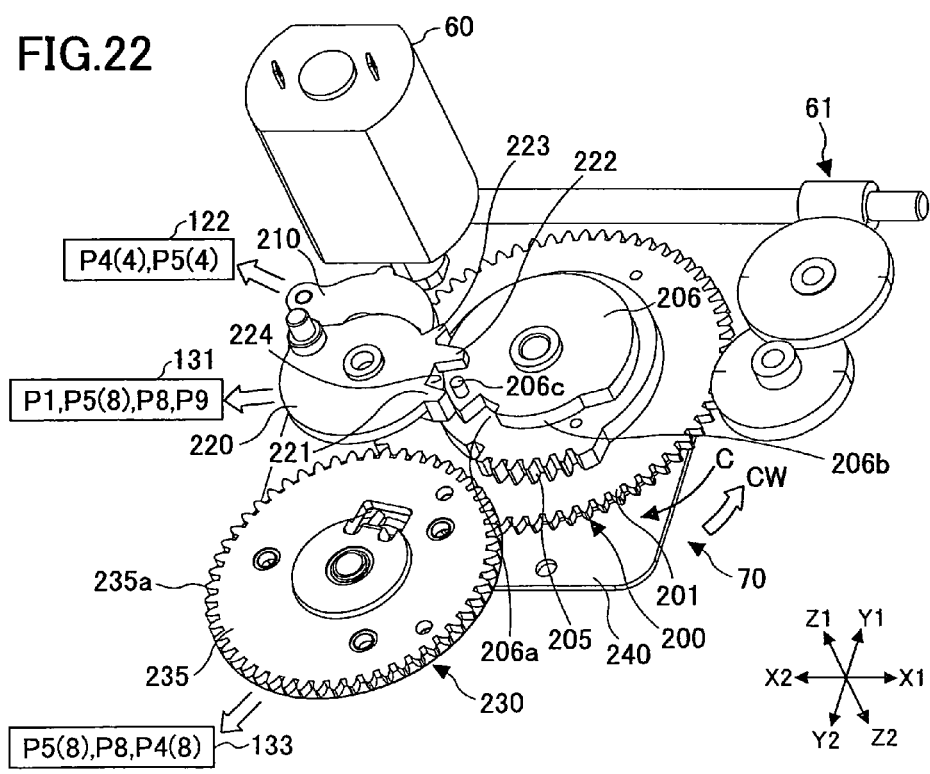
FIG. 22 is a perspective view of a second motion transmitting mechanism.
Figure 23:
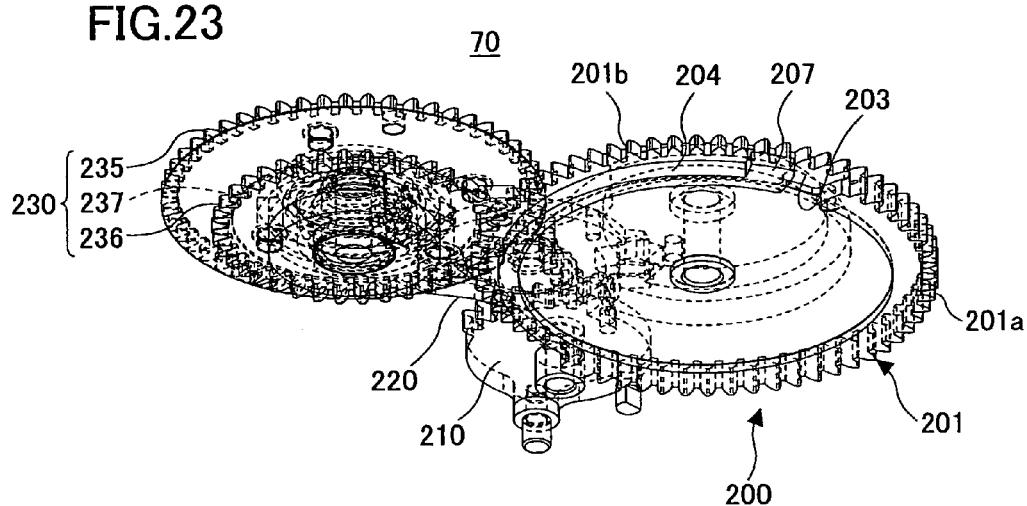
FIG. 23 is a downside perspective view of the second motion transmitting mechanism.
Figure 24:
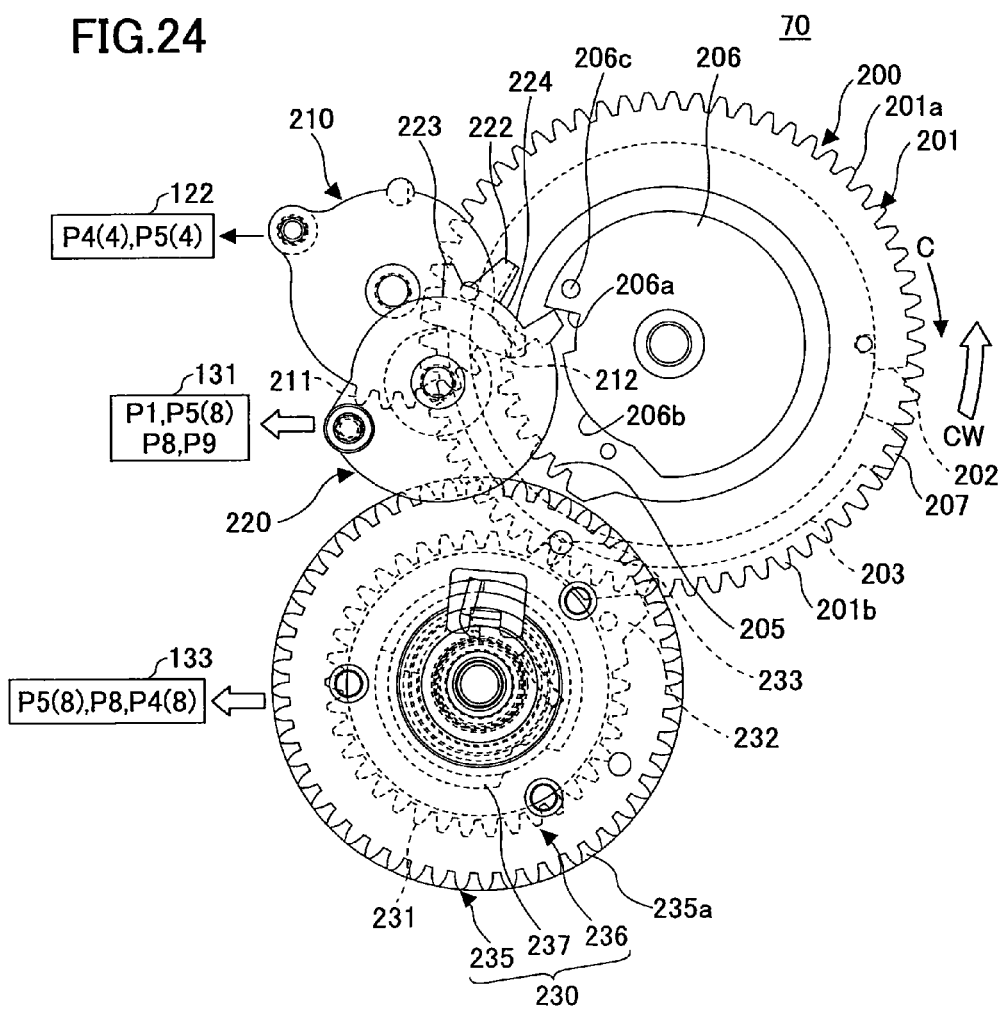
FIG. 24 is a plan view of the second motion transmitting mechanism.

FIGS. 22, 23, and 24 illustrate the second motion transmitting mechanism 70 of the streamer device 30. FIG. 22 is a perspective view of the second motion transmitting mechanism 70 from the upper side, FIG. 23 is a perspective view of the second motion transmitting mechanism 70 from the lower side, and FIG. 24 is a diagram showing the state of the second motion transmitting mechanism 70 when the streamer device 30 is in the state as is shown in FIG. 1, such a state being referred to as initial state hereinafter. It is noted that FIG. 22 shows the state of the second motion transmitting mechanism 70 after the poles P1, P5(8), P8, and P9 moving operations 131 are completed.

As is shown in FIGS. 22, 23, and 24, the second motion transmitting mechanism 70 includes an individual mode switching gear 200, a first drive gear 210, a second drive gear 220, a third drive gear 230, and an operation state detection substrate 240. The mode switching gear 200 is provided at the Z2 side of the common mode switching gear 171 and is arranged to be coaxial with the common mode switching gear 171. The first, second, and third drive gears 210, 220, and 230 are provided in the vicinity of the individual mode switching gear 200, and as is described in detail below, these drive gears 210, 220, and 230 are arranged to be temporarily driven at different timings in response to the rotation of the individual mode switching gear 200. It is noted that a mode switching pattern 209 is formed at the lower surface of the individual mode switching gear 200, and the operation state detection substrate 204 includes plural photo detectors. The operation state detection substrate 204 optically detects the rotation angle position of the individual mode switching gear 200 based on the combination of outputs from the photo detectors to detect the operation state of the second motion transmitting mechanism 70.

As is shown in FIG. 2, a detection signal is transmitted from the operation state detection substrate 240 to the control circuit 82, and a control signal is transmitted from the control circuit 82 to the motor drive circuit 81. Accordingly, the motor drive circuit 81 is operated and the individual operations motor 60 is activated and deactivated at predetermined timings to realize the poles P4(4) and P5(4) moving operations 122 of FIG. 3, the poles P1, P5(8), and P9 raising operations 131, and the poles P5(8), P8, and P4(8) moving operations 133 of FIG. 4. It is noted that in the illustrated embodiment, the individual mode switching gear itself is provided with a mode switching function, and thereby, the mode position may be accurately determined compared to an arrangement in which the mode switching function is provided elsewhere.

The individual mode switching gear 200 includes a gear portion 201, a recessed portion 202, and an arc-shaped recessed portion 203. Also, a partial gear portion 205 and a cam portion 206 are provided on the surface of the individual mode switching gear 200 to form a stepped arrangement. The recessed portion 202 and the arc-shaped recessed portion 203 are formed by cutting a Z2-side half section of the gear portion 201. The recessed portion 202 and the arc-shaped recessed portion 203 are positioned next to each other with a protruding portion 207 provided therebetween. The arc-shaped recessed portion 203 extends over an angle of approximately 120 degrees. The gear portion 201 includes a full-length gear portion 201a and a half-length gear portion 201b. The cam portion 206 includes a recessed portion 206a, an arc-shaped recessed portion 206b, and a pin portion 206c provided next to the recessed portion 206a.

The first drive gear 210 includes a partial gear portion 211 and a protruding portion 212 at one end of the partial gear portion 211. In the initial state, the partial gear portion 211 is not engaged with the partial gear portion 205. The first drive gear 210 may be rotated by a predetermined angle to realize the poles P4(4) and P5(4) moving operations 122.

The second drive gear 220 includes three protruding portions 221, 222, and 223. Also, an arc-shaped recessed portion 224 is formed between the protruding portions 221 and 223. The protruding portion 222 is provided around the center of the arc-shaped recessed portion 224, and protrudes from the upper surface edge of the second drive gear 220. In the initial state, the protruding portion 221 is engaged by the recessed portion 206a. The second drive gear 220 may be rotated by a predetermined angle to realize the poles P1, P5(8), P8, and P9 raising operations 131.

The third drive gear 230 includes an upper drive gear 235, a lower drive gear 236, and a helical torsion spring 237 that is provided between the upper and lower drive gears 235 and 236. Normally, the upper drive gear 235 and the lower drive gear 236 are rotated integrally. The upper drive gear 235 includes a gear portion 235a across the entire periphery of the upper drive gear 235. The lower drive gear 236 includes a gear portion 231 that extends across approximately a 270-degree angle, and first and second protruding portions 232 and 233 protruding in an outer radial direction. The first and second protruding portions 232 and 233 are slightly set apart from each other. The first protruding portion 232 is arranged to correspond to the depth of the recessed portion 202, and the second protruding portion 233 is arranged to correspond to the depth of the arc-shaped recessed portion 203 (i.e, the first protruding portion 232 protrudes higher than the second protruding portion 233). In the initial state, the second protruding portion 233 is engaged with the arc-shaped recessed portion 203, and the partial gear portion 231 is not engaged with the gear portion 201. The third drive gear 230 may be rotated by a predetermined angle to realize the pole P5(8), P8, and P4(8) moving operations 133. The helical torsion spring 237 is twisted at the last stage of the operation to generate a force for urging the poles P5(8), P8, and P4(8) to their corresponding stoppers.

In the following, rotation transmitting operations for transmitting a rotational motion from the individual mode switching gear 200 to the first, second, and third drive gears 210, 220, and 230 are described.

When the individual operations motor 60 is driven to rotate in a clockwise direction, the rotation is transmitted via the worm gear mechanism 61, and the individual mode switching gear 200 is rotated in a clockwise direction by approximately 30 degrees. When the individual operations motor 60 is rotated in the reverse direction, namely, in a counter-clockwise direction, the individual mode switching gear 200 is rotated in a counter-clockwise direction by approximately 360 degrees.

When the individual mode switching gear 200 is rotated from the initial state in a clockwise direction by a predetermined angle, the protruding portion 212 is pushed, the gear portion 205 engages the partial gear portion 211 (see FIG. 25A), and the first drive gear 210 is rotated in a counter-clockwise direction (see FIG. 25B) to reach the position as is indicated in FIG. 25C. It is noted that during this operation, the second and third drive gears 220 and 230 are maintained at standstill states. When the individual mode switching gear 200 is rotated in a direction for returning to the initial state from the rotated state, the first drive gear 210 is rotated in a clockwise direction to be set back to the initial state.

Figure 26A:
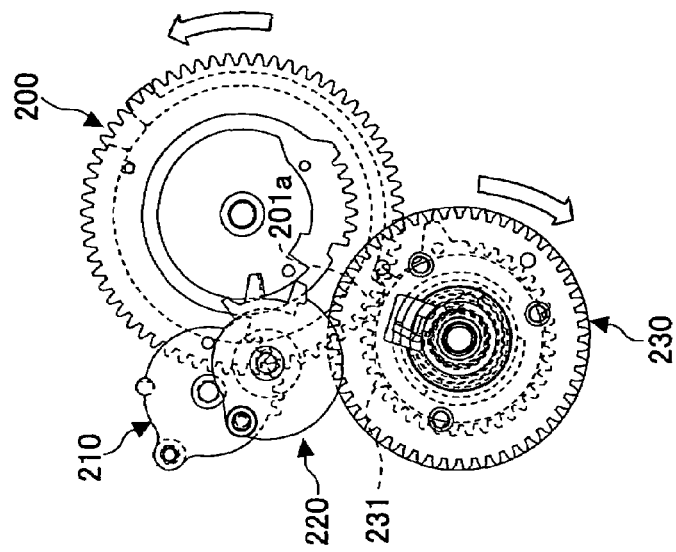
FIGS. 26A~26C are diagrams illustrating motion transmission to a second drive gear that is performed in response to a counter-clockwise rotation of the individual mode switching gear.

Also, when the individual mode switching gear 200 is rotated from the initial state in a counter-clockwise direction by a predetermined angle, the protruding portion 221 is pushed by the edge of the recessed portion 206a, and the second drive gear 220 is rotated in a clockwise direction by a predetermined angle (see FIG. 26A). When the second drive gear 220 is rotated and the protruding portion 221 passes the recessed portion 206a, the recessed portion 224 faces the cam portion 206, and the second drive gear 220 is maintained at this position thereinafter. In this state, the protruding portion 222 is positioned at the upper surface side of the cam portion 206.

Figure 26B:
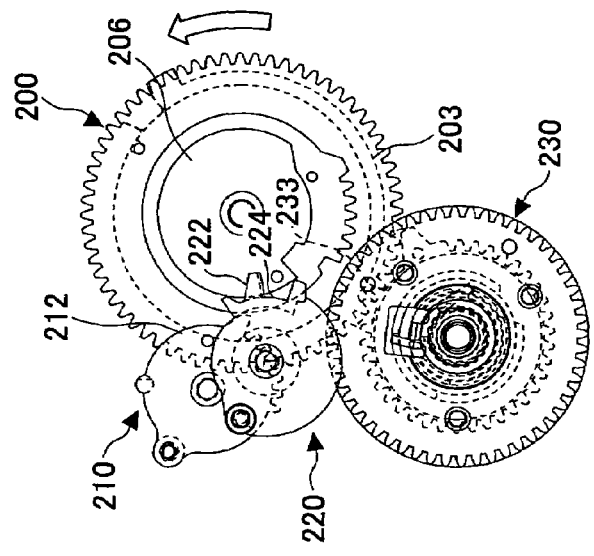
Figure 26C:
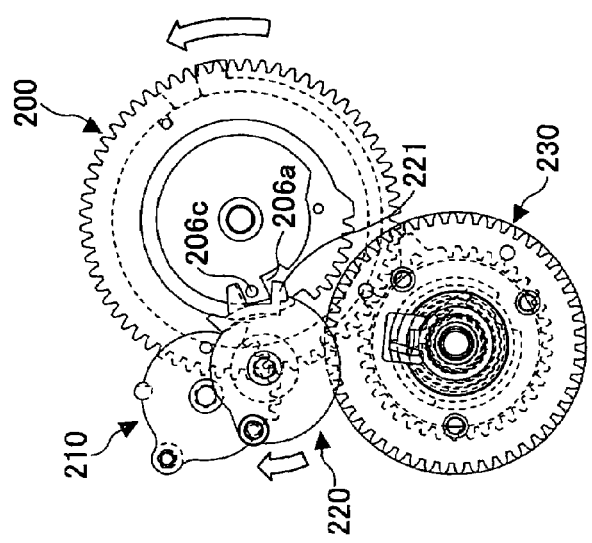
Figure 27A:
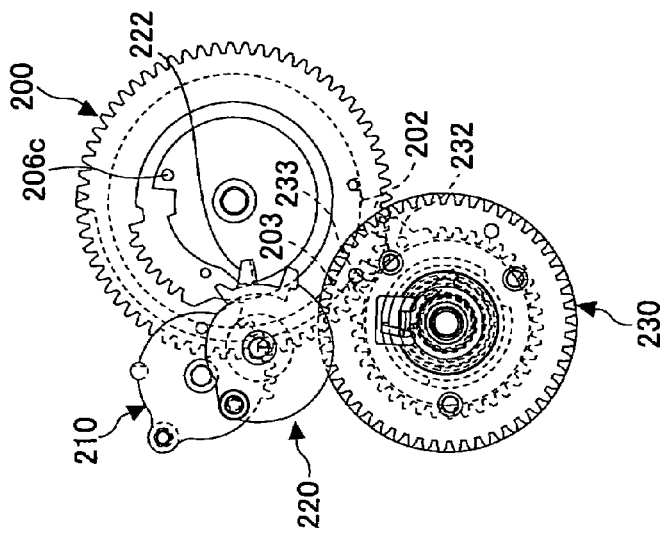
FIGS. 27A~27C are diagrams illustrating motion transmission to a third drive gear that is performed in response to a further counter-clockwise rotation of the individual mode switching gear.
Figure 27B:
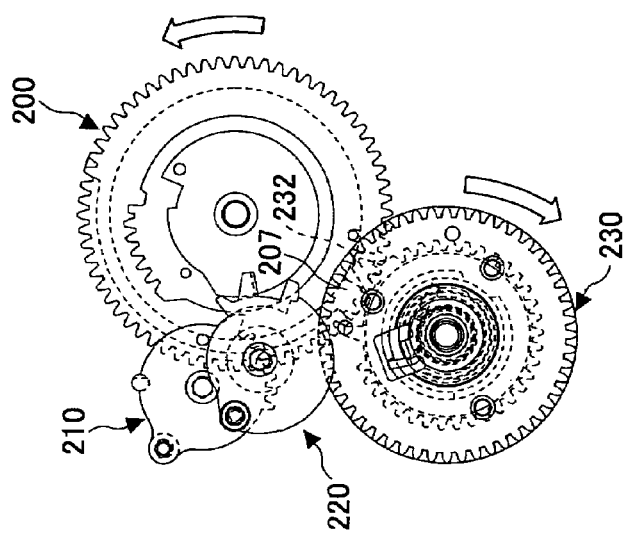
Figure 27C:
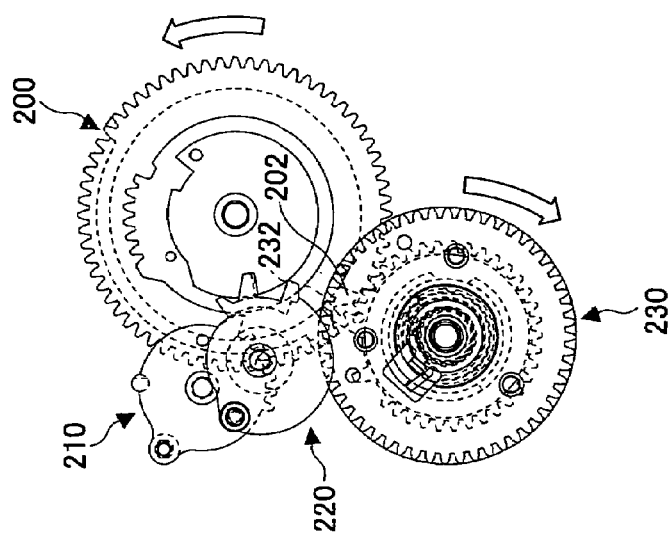

When the individual mode switching gear 200 is rotated further in a counter-clockwise direction, the edge of the arc-shaped recessed portion 203 pushes the second protruding portion 233 to induce an initial rotation of the third drive gear 230 (see FIG. 26B). Then, as is shown in FIG. 26C, the gear portion 201a and the gear portion 231 are engaged with each other, and the third drive gear 230 is rotated in a clockwise direction. When the third drive gear 230 is rotated by approximately 270 degrees, the first protruding portion 232 enters the recessed portion 202 (see FIG. 27A), the protruding portion 207 pushes the first protruding portion 232 (see FIG. 27B), and the rotation of the third drive gear 230 is transmitted with a strong force to reach a final position as is shown in FIG. 27C. In this state, the first protruding portion 232 is positioned past the recessed portion 202 and the second protruding portion 233 is inserted into the arc-shaped recessed portion 203. It is noted that during this operation, the first drive gear 210 is maintained at a standstill state.

When the individual mode switching gear 200 is rotated in a direction for returning to the initial state from the rotated state, first, the third drive gear 230 is rotated in a counter-clockwise direction to be set back to the initial state. Then, the pin portion 206c pushes the protruding portion 222, and the second drive gear 220 is rotated in a counter-clockwise direction to return to the initial state.

9. [Individual Operations]

In the following, the operations 121, 131, and 133 are described in detail.

Figure 28:
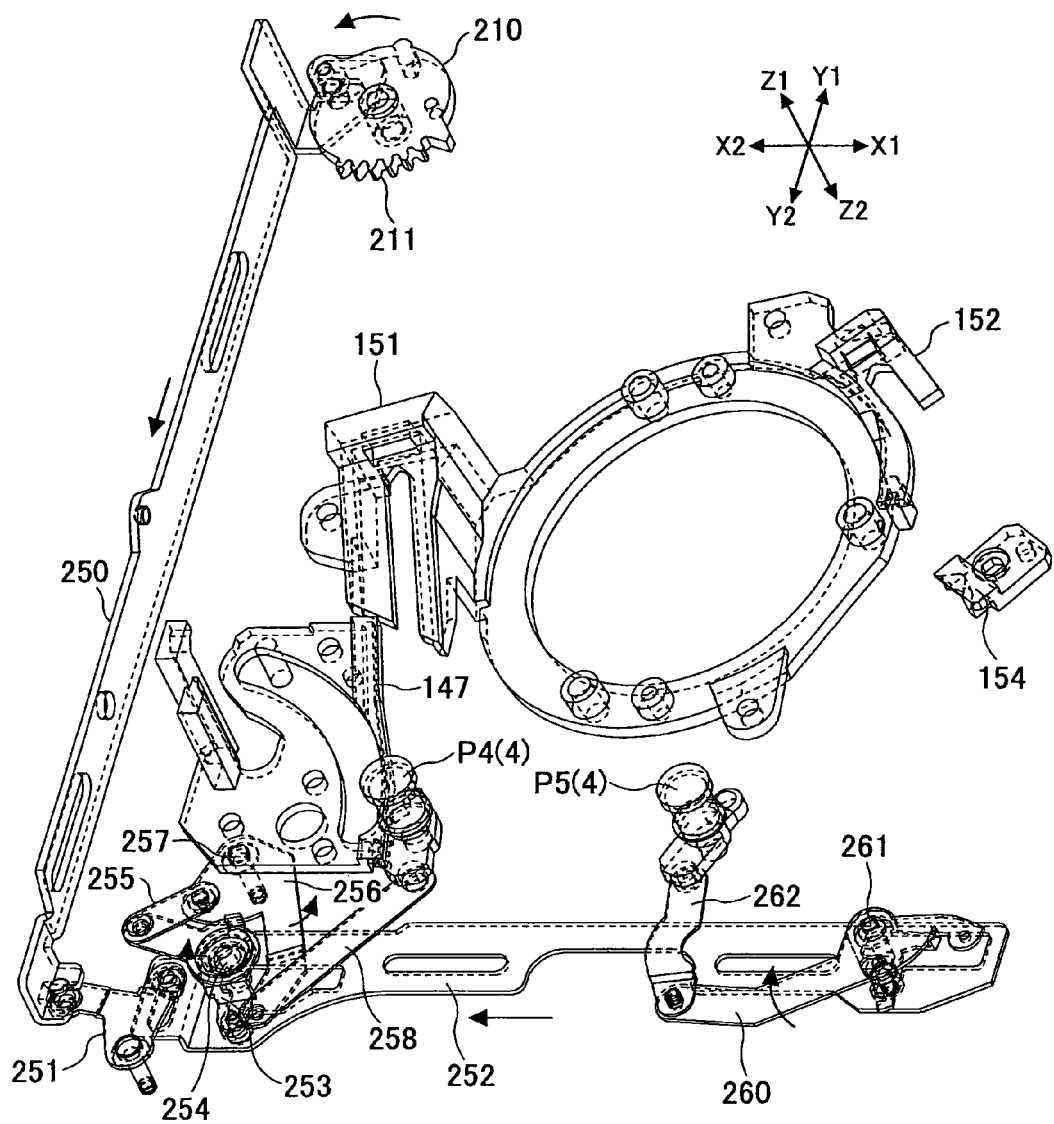
FIG. 28 is a perspective view showing the initial state of another pole moving mechanism.
Figure 29:
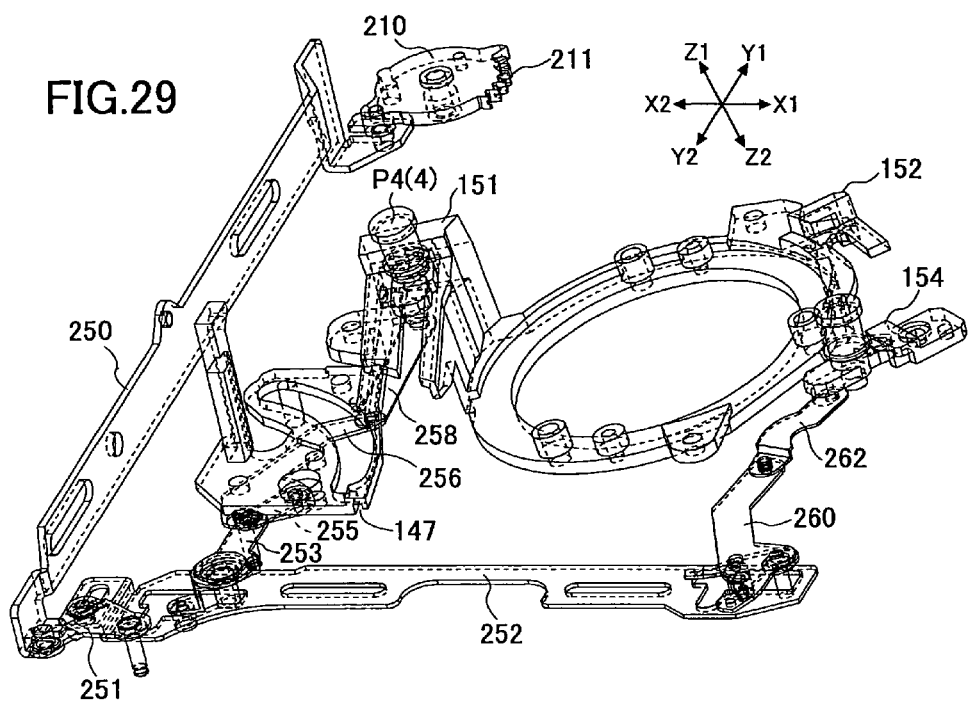
FIG. 29 is a perspective view showing the state of the pole moving mechanism of FIG. 28 when corresponding poles are moved.

[Poles P4(4) and P5(4) Moving Operations 122] (see FIGS. 28 and 29)

FIG. 28 shows the initial state of a pole moving mechanism for moving the poles P4(4) and P5(4). FIG. 29 shows the state of the pole moving mechanism after the poles P4(4) and P5(4) are moved. When the first drive gear 210 is rotated in a counter-clockwise direction by the individual mode switching gear 200, a slide lever 250 is slid in the Y2 direction, and a slide lever 252 is slid in the X2 direction via a rotation lever 251. In response to the sliding motion of the slide lever 252, first, a rotating lever 253 is rotated in a clockwise direction around a stationary axis 254, and a rotating lever 256 is rotated in a counter-clockwise direction around a stationary axle 257 via a link 255. The rotational force of the rotating lever 256 is transmitted to the pole P(4) via a link 258, and the pole P4(4) moves in the Y1 direction along the guide rail portion 147 until reaching the position of the stopper 151 as is shown in FIG. 29. Second, in response to the sliding motion of the slide lever 252, a rotating lever 260 is rotated in a clockwise direction around a stationary axle 261, and this rotation is transmitted to the pole P5(4) via a link 262. In turn, the pole P5(4) moves in the Y1 direction until reaching the position of the stopper 154 as is shown in FIG. 29.

When the first drive gear 210 is rotated in a clockwise direction from the rotated state, the pole moving mechanism for the poles P4(4) and P5(4) is set back to the initial state as is shown in FIG. 28 from the state shown in FIG. 29.

Figure 30:
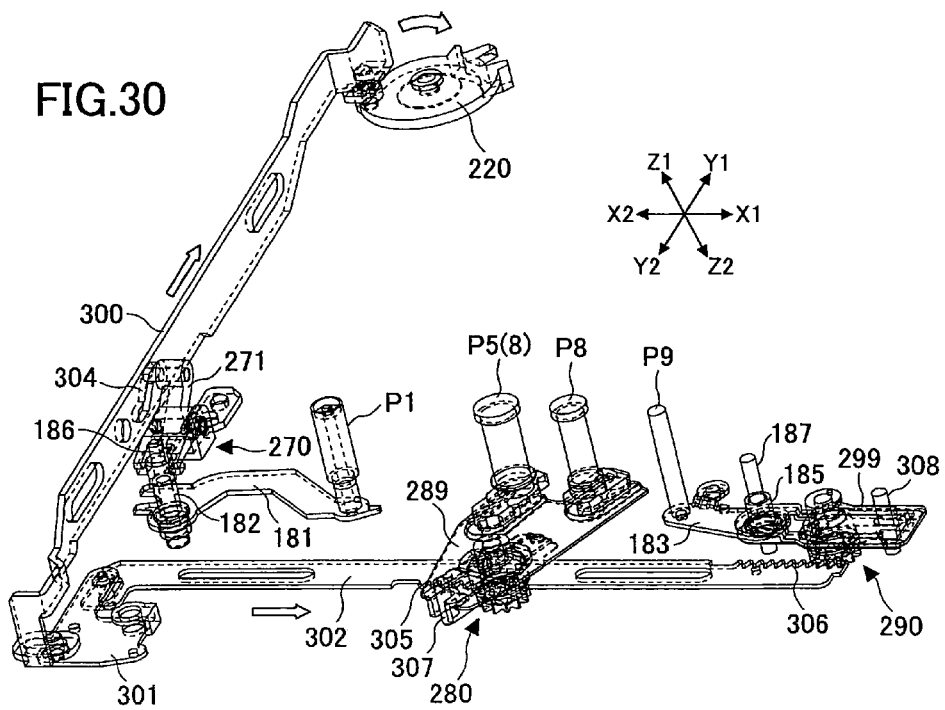
FIG. 30 is a perspective view showing the initial state of a pole raising/lowering mechanism.

[Poles P1, P5(8), P8, and P9 Raising Operations] (see FIGS. 30 though 33)

Figure 31:
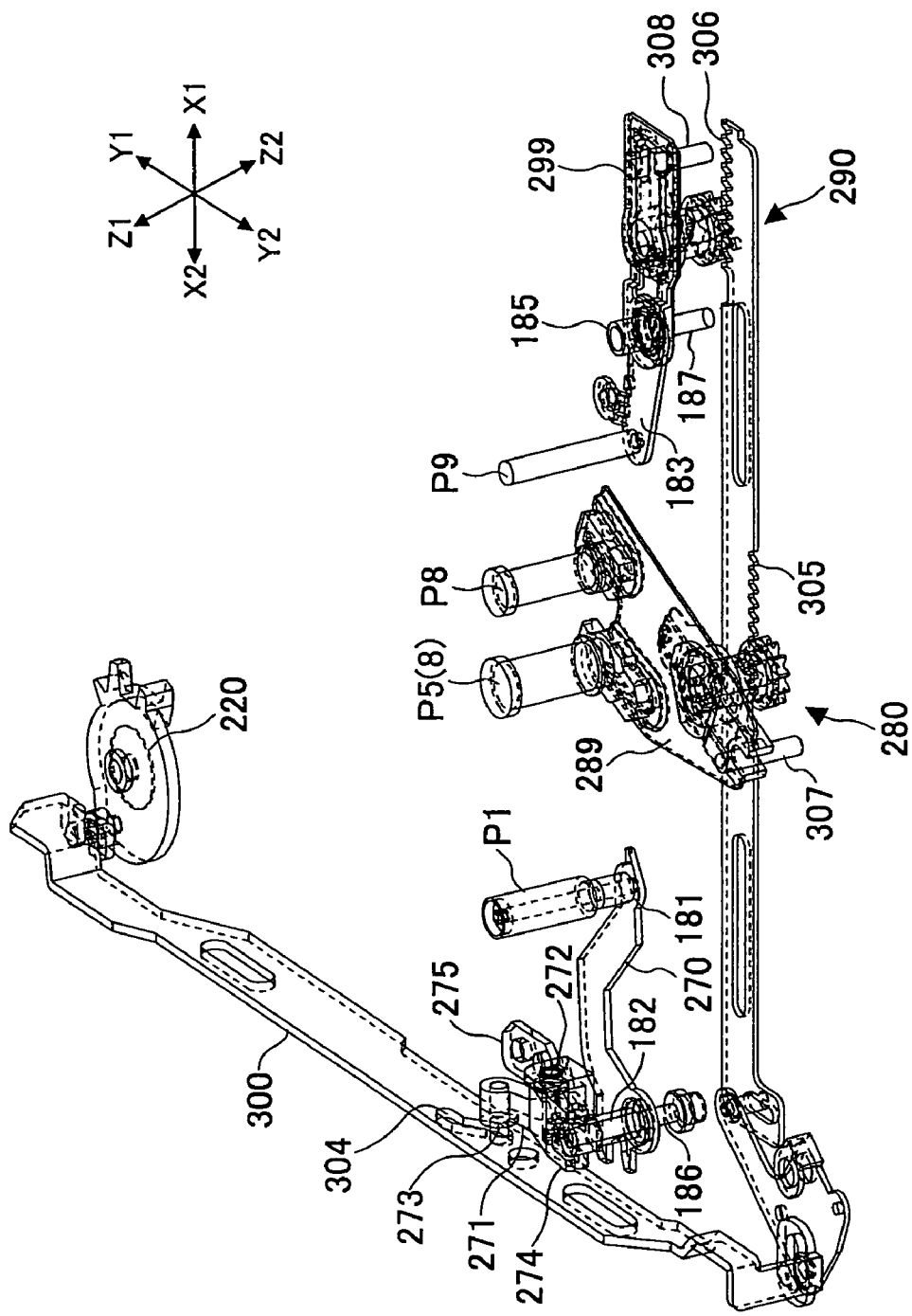
FIG. 31 is a perspective view showing the state of the pole raising/lowering mechanism of FIG. 30 when corresponding poles are raised.

FIG. 30 shows the initial state of a pole raising/lowering mechanism for the poles P1, P5(8), P8, and P9. FIG. 31 shows the state of the pole raising/lowering mechanism after the poles P1, P5(8), P8, and P9 are raised.

When the second drive gear 220 is rotated in a clockwise direction by the individual mode switching gear 200, a slide lever 300 is slid in the Y1 direction, and a slide lever 302 is slid in the X1 direction via a rotating lever 301. The slide lever 300 includes a cam trench 304, and the slide lever 302 includes racks 305 and 306.

It is noted that a see-saw type pole raising/lowering mechanism 270 is provided for the pole P1, a spiral cam type pole raising/lowering mechanism 280 is provided for the poles P5(8) and P8, and a spiral cam type pole raising/lowering mechanism 290 is provided for the pole P9.

The pole raising/lowering mechanism 270 includes a lever 271 having a center axle 272 that is supported by a bracket 275 to oscillate back and forth. A pin 273 at the Y1 side end of the lever 271 is engaged with the cam trench 304 of the slide lever 300, and a forked portion at the Y2 side end of the lever 271 is connected to the sleeve 182.

When the slide lever 300 is slid in the Y1 direction, the lever 271 is rotated by the cam trench 304 in a direction that causes the forked portion 274 to be raised, and the sleeve 182 is moved in the Z1 direction along the stationary post 186 so that the pole P1 is raised (see FIG. 31).

Figure 32:
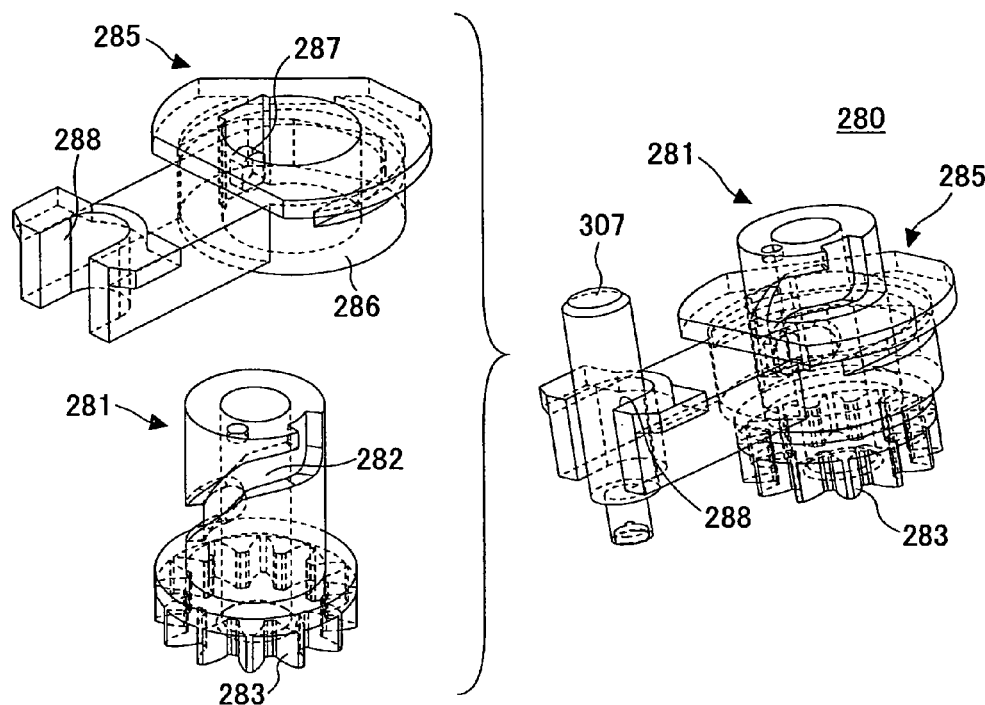
FIG. 32 is an enlarged view of one portion of the pole raising/lowering mechanism of FIG. 30.

The pole raising/lowering mechanism 280 includes a spiral cam member 281 and a raising/lowering member 285 (see FIG. 32). The spiral cam member 281 has a spiral cam trench 282 formed around its cylindrical portion, and a gear 283 provided at its bottom portion. The spiral cam member 281 is engaged and supported by a stationary post that is fixed to the chassis base. The gear 283 is engaged with the rack 305 of the slide lever 203. The raising/lowering member 285 includes a cylindrical portion 286 that is engaged with the spiral cam member 281, a cam follower 287 that is engaged with the spiral cam trench 282, and a U-shaped trench portion 288 that is engaged by and fit to a stationary post 307 that is fixed to the chassis base. A stage 289 (see FIG. 31) is fixed to the upper surface of the raising/lowering member 285, and the poles P5(8) and P8 are supported by the stage 289.

As is shown in FIG. 31, when the slide lever 302 is slid in the X1 direction, the spiral cam member 281 is rotated in a clockwise direction by the rack 305, the cam follower 287 is guided by the spiral cam trench 282, the raising/lowering member 285 is moved in the Z1 direction, and the poles P5(8) and P8 are raised along with the stage 289. It is noted that the poles P5(8) and P8 may be raised by moving one end of links 340 and 342 shown in FIG. 34.

Figure 33:
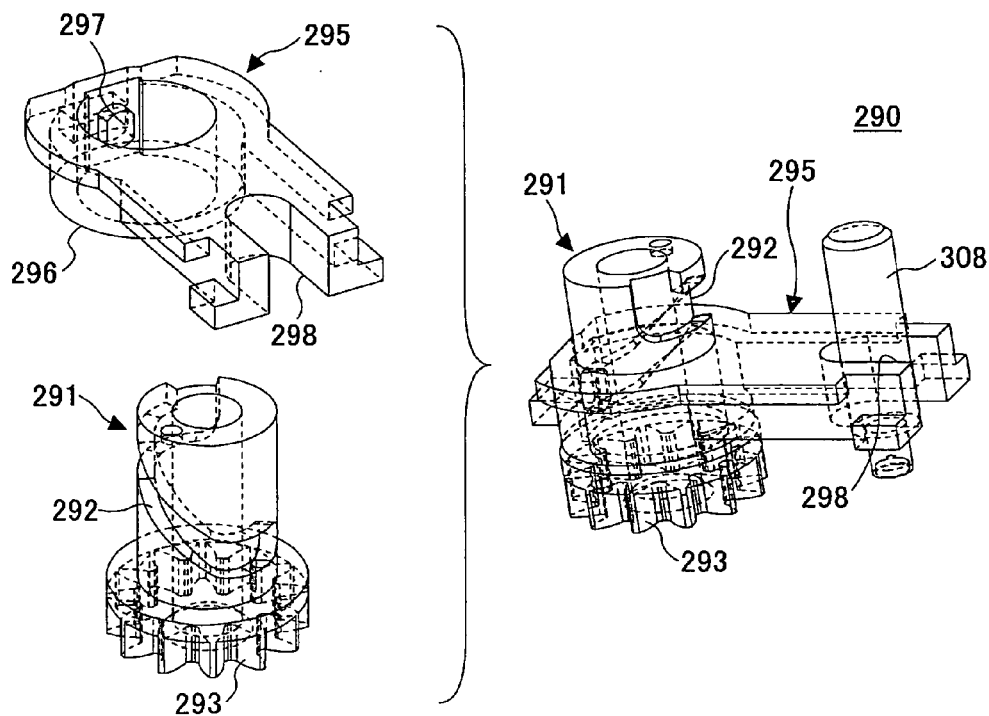
FIG. 33 is an enlarged view of another portion of the pole raising/lowering mechanism of FIG. 30.

The pole raising/lowering mechanism 290 has a same structure as that of the pole raising/lowering mechanism 280. As is shown in FIG. 33, the pole raising/lowering mechanism 290 includes a spiral cam member 291 and a raising/lowering member 295. The spiral cam member 291 is engaged and supported by a stationary post that is fixed to the chassis base, and includes a gear 293 that is engaged with the rack 306. The raising/lowering member 295 includes a cylindrical portion 296 that is engaged with the spiral cam member 291, a cam follower 297 that is engaged with the spiral cam trench 292, and a U-shaped trench portion 298 that is engaged by and fit to a stationary post 308 that is fixed to the chassis base. A stage 299 (see FIG. 31) is fixed to the upper surface of the raising/lowering member 295, and the stage 299 supports the arms 183 and 184 (see FIG. 21).

As is shown in FIG. 31, when the slide lever 302 is slid in the X1 direction, the spiral cam member 291 is rotated in a counter-clockwise direction by the rack 306, the cam follower 297 is guided by the spiral cam trench 292, the raising/lowering member 295 and the stage 299 are moved in the Z1 direction, the arms 183 and 184 are raised by the stage 299, the sleeve 185 is slid in the Z1 direction along the stationary post 187, and the pole P9 is raised along with the arms 183 and 184.

When the second drive gear 220 is rotated in a counter-clockwise direction from the rotated state, the pole raising/lowering mechanism is set back to the initial state as is shown in FIG. 30 from the state shown in FIG. 31.

Figure 34:
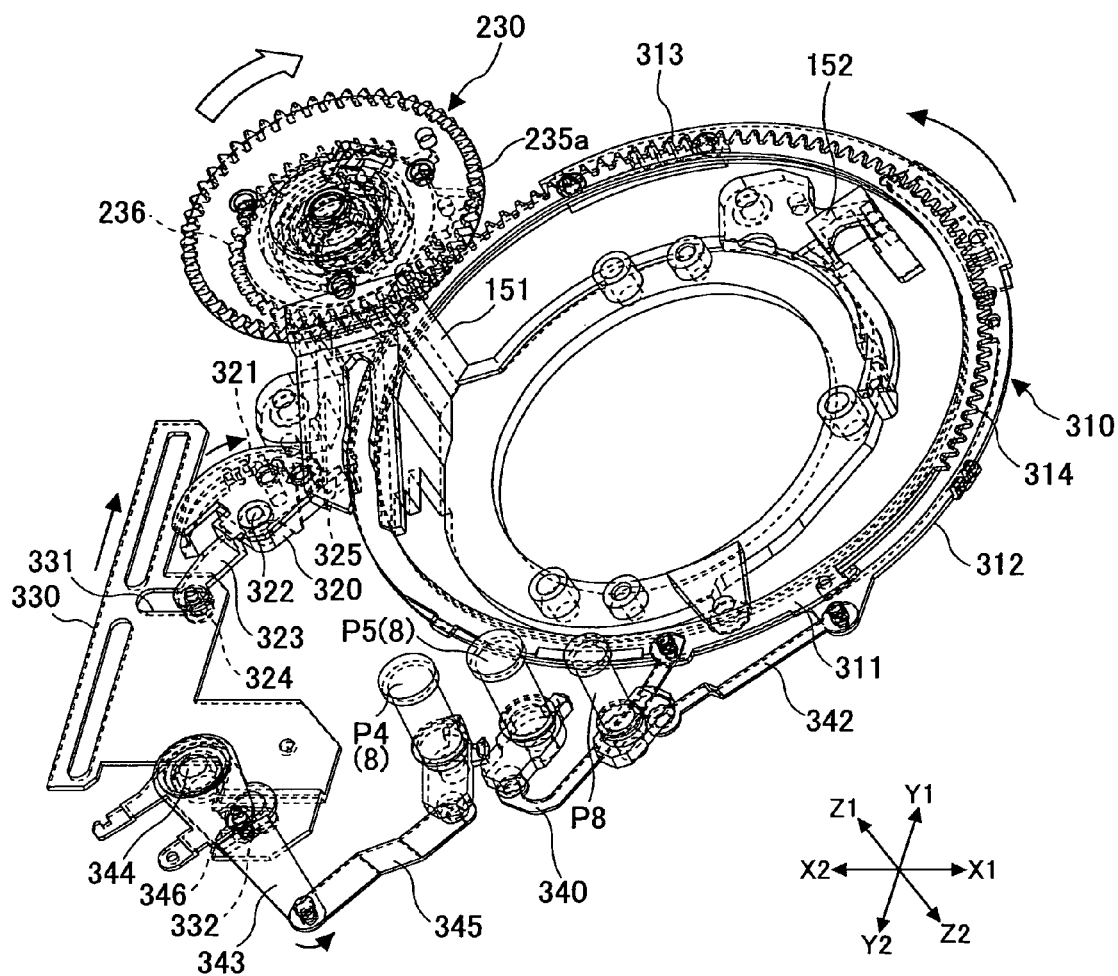
FIG. 34 is a perspective view showing the initial state of another pole moving mechanism.
Figure 35:
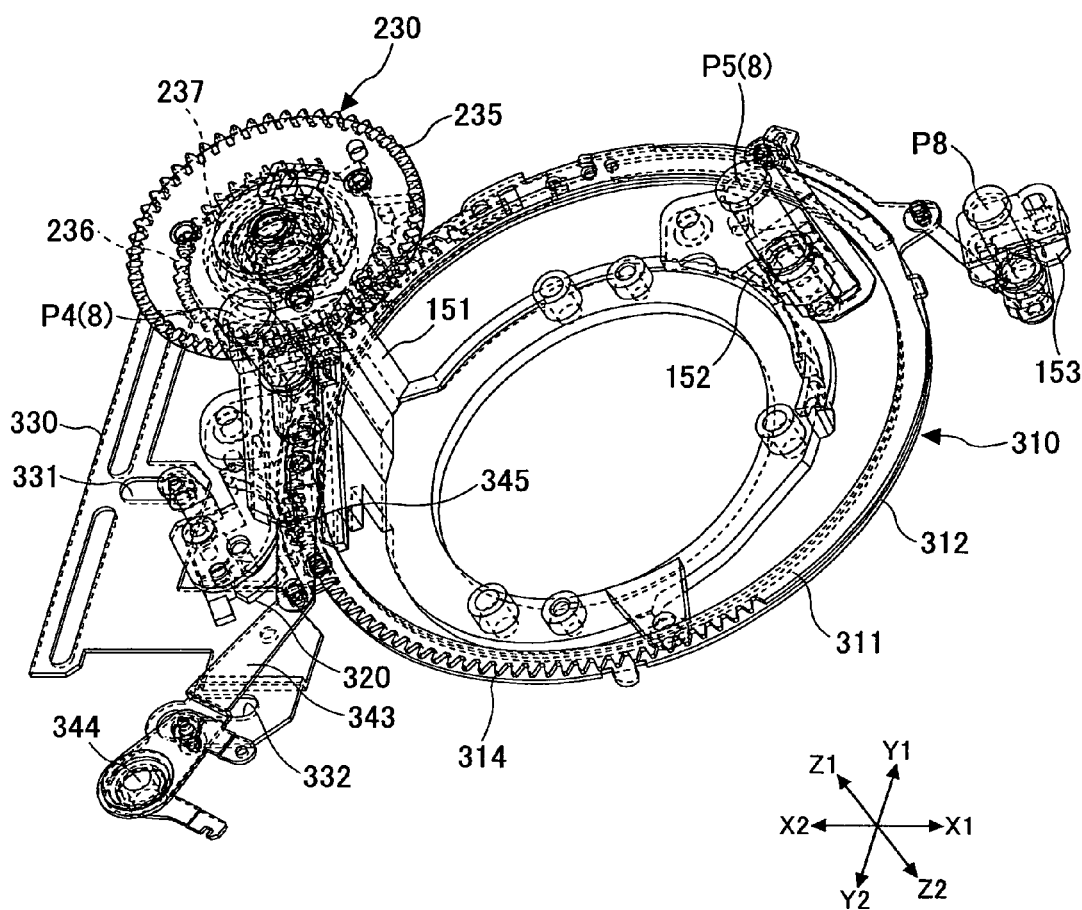
FIG. 35 is a perspective view of the state of the pole moving mechanism of FIG. 34 when corresponding poles are moved.

[Poles P5(8), P8, and P4(8) Moving Operations 133] (see FIGS. 34 and 35)

FIG. 34 shows the initial state of a pole moving mechanism for the poles P5(8), P8, and P4(8). FIG. 35 shows the state of the pole moving mechanism after the poles P5(8), P8, and P4(8) are moved.

The pole moving mechanism of FIGS. 34 and 35 includes a ring structure 310. The ring structure 310 is supported by the chassis base at its inner circumferential area, and is arranged to surround the rotating drum unit 31. The ring structure 310 includes a first ring member 311 and a second ring member 312 that face each other and are attached together by arc-shaped holes and pins. The first and second ring members 311 and 312 are arranged to be able to rotate relative to each other over a predetermined angle range, and are pulled in one direction by a tension spring 313 to form an integral structure. It is noted that a gear portion 314 is formed at the first ring member 311 across a predetermined angle range, and the gear portion 235a of the third drive gear 230 and the gear portion 314 of the ring structure 310 are arranged to be engaged with one another.

As is shown in the drawings, a fan-shaped gear 320 that includes a gear portion 321 and is supported by a stationary post 322 extending from the chassis base is positioned at the X2 side of the ring structure 310. A protruding portion 325 is provided at an edge of the gear portion 321.

Also, a slide board 330 that is arranged to slide in the Y1 direction is engaged with the fan-shaped gear 320. The slide board 330 includes an elongated hole 331 into which the tip of a pin 324 of an arm portion 323 of the fan-shaped gear 320 is inserted to realize the engagement between the slide board 330 and the fan-shaped gear 320.

The pole P5(8) is connected to the first ring member 311 via the link 340. The pole P8 is connected to the second ring member 312 via the link 342. A rotating arm 343 is supported by a stationary post extending from the chassis base, and the pole P4(8) is connected to the tip of the rotating arm 343 via a link 345. A pin 346 is provided at a middle section of the rotating arm 343, and the pin 346 is engaged with a U-shaped cut portion 332 of the slide board 330.

When the third drive gear 230 is rotated in a clockwise direction by the individual mode switching gear 200, the ring structure 310 is rotated in a counter-clockwise direction owing to the engagement between the gear portion 235a and the gear portion 314 so that the poles P5(8) and P8 start moving. At a point where the poles P5(8) and P8 are still being moved, the protruding portion 325 is pushed by a protruding portion of the ring structure 310 to induce the initial rotation of the fan-shaped gear 320 in a clockwise direction. Then, the gear portion 314 engages the gear portion 321, the fan-shaped gear 320 is rotated in a clockwise direction, the slide board 330 is slid in the Y1 direction, the rotating arm 343 is rotated in a counter-clockwise direction, the link 345 is pushed, and the pole P4(8) starts moving.

As is shown in FIG. 35, the poles P5(8), P8, and P4(8) move until reaching the stoppers 152, 153, and 151, respectively. At this point, the first ring member 311 may not rotate any further in a counter-clockwise direction, and since the gear portion 235a and the gear portion 314 engage with one another, the upper drive gear 235 of the third drive gear 230 may not rotate any further. The rotation of the individual mode switching gear 200 continues for some time, and in turn, only the lower drive gear 236 of the third drive gear 230 rotates in a clockwise direction while twisting the helical torsion spring 237. When the rotation of the individual mode switching gear 200 is stopped, the spring force of the helical torsion spring 237 is transmitted via the upper drive gear 235 to the ring structure 310 and the fan-shaped gear 320. In turn, the ring structure 310 is urged toward a counter-clockwise direction, and the pole P5(8) is pushed to the stopper 152 by this force. Also, the fan-shaped gear 320 is urged toward a clockwise direction, and the pole P4(8) is pushed to the stopper 151 by this force. The pole P8 is urged to the stopper 153 by the spring force of the tension spring 313 of the ring structure 310.

When the third drive gear 230 is rotated in a counter-clockwise direction from the rotated position, the pole moving mechanism in the state shown in FIG. 35 is set back to the initial state shown in FIG. 34.

Also, it is noted that in the illustrated embodiment, the common mode is independently determined by the common mode switching gear 171, and the individual mode is independently determined by the individual mode switching gear 200. Therefore, the order of performing common mode operations and individual mode operations may be easily changed with software, for example.

Further, it is noted that the present invention is not limited to the specific embodiments described above, and variations and modifications may be made without departing from the scope of the present invention. For example, the present invention may be applied to a recording/reproducing device using a magnetic tape other than a streamer device.

The present application is based on and claims the benefit of the earlier filing date of Japanese Patent Application No. 2004-288244 filed on Sep. 30, 2004, the entire contents of which are hereby incorporated by reference.

What is claimed is:

1. A magnetic recording/reproducing apparatus that is arranged to receive a tape cassette accommodating a tape recording medium that is selectively loaded thereto, the loaded tape cassette being selected from a plurality of types of tape cassettes including a first tape cassette accommodating a first tape recording medium having a first width and a second tape cassette accommodating a second tape recording medium having a second width that is greater than the first width, the apparatus comprising:

a rotating drum unit including a rotating head; and
a loading mechanism that is configured to pull the tape recording medium of the loaded tape cassette out of the loaded tape cassette, wind the tape recording medium of the loaded tape cassette around the rotating drum unit, and form a tape path;
wherein the loading mechanism includes a short loading pole that is adapted for the first tape cassette, and a long loading pole that is adapted for the second tape cassette, the short pole and the long pole being positioned at a same height; and a loading pole raising mechanism that is configured to raise the long loading pole when the second tape cassette is loaded, the loading pole raising mechanism comprising:

a spiral cam member having a cylindrical portion and a spiral cam trench formed around the cylindrical portion; and a raising/lowering member having a cam follower that is engaged with the spiral cam trench, which raising/lowering member is slidably supported by the spiral cam member; and when the spiral cam member is rotated, the cam follower is guided by the spiral cam trench, and the raising/lowering member is raised to cause the long loading pole to be raised.

2. The magnetic recording/reproducing apparatus as claimed in claim 1, wherein the loading pole raising mechanism includes an oscillating lever; and when the oscillating lever is oscillated, the long loading pole is raised by an end portion of the oscillating lever.

3. The magnetic recording/reproducing apparatus as claimed in claim 1, wherein the loading pole raising mechanism includes a guide rail portion that is configured to guide the long loading pole when said long loading pole is moved, the guide rail portion including a sloped portion that slopes in an upward direction.

* * * * *